(12) United States Patent
Shin et al.

(10) Patent No.: US 12,402,105 B2
(45) Date of Patent: Aug. 26, 2025

(54) METHOD AND APPARATUS FOR MANAGING RESOURCE POOL IN WIRELESS COMMUNICATION SYSTEM

(71) Applicant: Samsung Electronics Co., Ltd., Gyeonggi-do (KR)

(72) Inventors: Cheolkyu Shin, Gyeonggi-do (KR); Jeongho Yeo, Gyeonggi-do (KR); Jinyoung Oh, Gyeonggi-do (KR); Hyunseok Ryu, Gyeonggi-do (KR); Sungjin Park, Gyeonggi-do (KR); Jonghyun Bang, Gyeonggi-do (KR); Taehan Bae, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 17/736,584

(22) Filed: May 4, 2022

(65) Prior Publication Data

US 2022/0272698 A1 Aug. 25, 2022

Related U.S. Application Data

(63) Continuation of application No. 16/803,314, filed on Feb. 27, 2020, now abandoned.

(30) Foreign Application Priority Data

Feb. 28, 2019 (KR) .................. 10-2019-0024391
Feb. 12, 2020 (KR) .................. 10-2020-0017223

(51) Int. Cl.
*H04W 72/0446* (2023.01)
*H04L 5/14* (2006.01)

(52) U.S. Cl.
CPC .......... *H04W 72/0446* (2013.01); *H04L 5/14* (2013.01)

(58) Field of Classification Search
None
See application file for complete search history.

(56) References Cited

U.S. PATENT DOCUMENTS

| 2016/0021625 | A1* | 1/2016 | Li | H04W 76/14 370/336 |
| 2018/0098322 | A1* | 4/2018 | Yoon | H04W 56/0005 |

(Continued)

FOREIGN PATENT DOCUMENTS

JP 6822418 1/2021

OTHER PUBLICATIONS

Translation of Ootsuji et al., JP 6822418 B2, filing date Dec. 15, 2016 (Year: 2016).

(Continued)

*Primary Examiner* — Faruk Hamza
*Assistant Examiner* — Cassandra L Decker
(74) *Attorney, Agent, or Firm* — The Farrell Law Firm, P.C.

(57) ABSTRACT

A method performed by a user equipment (UE) is provided. The method includes receiving resource configuration information for a sidelink; identifying a set of slots based on a subcarrier spacing configured for the UE; based on a bitmap included in the resource configuration information, identifying at least one slot for a sidelink resource, among the identified set of slots except specific slots, wherein the specific slots include a slot configured for a sidelink synchronization signal, a slot in which at least one symbol included in a subset of the slot is not configured as an uplink (UL) and a reserved slot; and transmitting a physical sidelink shared channel (PSSCH) on the identified at least one slot.

8 Claims, 10 Drawing Sheets

(56) References Cited

U.S. PATENT DOCUMENTS

| | | | |
|---|---|---|---|
| 2018/0249462 A1* | 8/2018 | Blasco Serrano | ............................ H04W 72/0446 |
| 2019/0349885 A1 | 11/2019 | Koskela | |
| 2020/0099479 A1* | 3/2020 | Park | ........................ H04W 4/70 |
| 2020/0229114 A1* | 7/2020 | Ryu | ................... H04L 27/26025 |
| 2020/0280961 A1 | 9/2020 | Lee | |
| 2021/0127364 A1* | 4/2021 | Panteleev | ............. H04L 1/1819 |
| 2021/0176747 A1* | 6/2021 | Yang | ..................... H04L 5/0094 |
| 2021/0212050 A1 | 7/2021 | Lu | |
| 2021/0250159 A1 | 8/2021 | Su | |
| 2021/0289474 A1* | 9/2021 | Wang | ..................... H04L 5/0044 |
| 2021/0329498 A1* | 10/2021 | Tang | ................. H04W 72/0446 |
| 2021/0329633 A1* | 10/2021 | Xing | ..................... H04L 5/0048 |

OTHER PUBLICATIONS

Intel Corporation, "Sidelink Synchronization for NR V2X Communication", R1-1900482, 3GPP TSG RAN WG1 Ad-Hoc Meeting 1901, Jan. 21-25, 2019, 12 pages.

NTT Docomo, Inc., "Sidelink Synchronization Mechanism for NR V2X", R1-1902800, 3GPP TSG RAN WG1 #96, Feb. 25-Mar. 1, 2019, 5 pages.

CATT, "Offline Discussion Summary of AI 7.2.4.1.3 V2X SL Synchronization", R1-190xxxx, 3GPP TSG RAN WG1 Ad-Hoc Meeting 1901, Jan. 21-25, 2019, 14 pages.

Korean Office Action dated Jul. 8, 2025 issued in counterpart application No. 10-2020-0024631, 8 pages.

\* cited by examiner

IN-COVERAGE SCENARIO

PARTIAL COVERAGE SCENARIO

OUT-OF-COVERAGE SCENARIO

INTER-CELL V2X COMMUNICATION SCENARIO (a) UNICAST V2X COMMUNICATION (b) GROUPCAST V2X COMMUNICATION

METHOD AND APPARATUS FOR MANAGING RESOURCE POOL IN WIRELESS COMMUNICATION SYSTEM

CROSS-REFERENCE TO RELATED APPLICATION(S)

This application is a Continuation Application of U.S. patent application Ser. No. 16/803,314, filed on Feb. 27, 2020, in the U.S. Patent and Trademark Office, which is based on and claims priority under 35 U.S.C. § 119 to Korean Patent Application No. 10-2019-0024391, filed on Feb. 28, 2019, in the Korean Intellectual Property Office, and to Korean Patent Application No. 10-2020-0017223, filed on Feb. 12, 2020, in the Korean Intellectual Property Office, the disclosures of which are incorporated by reference herein in their entireties.

BACKGROUND

1. Field

The disclosure relates generally to a method and apparatus for operating a resource pool in a wireless communication system, and more particularly, to a method and apparatus for non-contiguously operating a resource pool in a process in which a vehicle terminal supporting vehicle-to-everything (V2X) communication exchanges information with another vehicle terminal and a pedestrian mobile terminal by using a sidelink.

2. Description of Related Art

To meet the increase in demand for wireless data traffic after the commercialization of $4^{th}$ Generation (4G) communication systems, considerable efforts have been made to develop improved $5^{th}$ Generation (5G) communication systems or pre-5G communication systems. For this reason, 5G communication systems or pre-5G communication systems are called beyond 4G network communication systems or post long term evolution (LTE) systems. To achieve a high data rate, the implementation of 5G communication systems in an ultra-high frequency, or millimeter wave (mmWave) band (e.g., a 60 gigahertz (GHz) band), is under consideration.

To alleviate propagation path loss of radio waves and to increase propagation distances of radio waves in an ultra-high frequency band, technologies for 5G communication systems, such as beamforming, massive multiple input multiple output (MIMO), full dimensional MIMO (FD-MIMO), array antennas, analog beamforming, and large-scale antenna technologies are discussed. Also, in order to improve a system network for 5G communication systems, the development of techniques, such as evolved small cell techniques, advanced small cell techniques, cloud radio access network (cloud RAN) techniques, ultra-dense network techniques, device-to-device (D2D) communication techniques, wireless backhaul techniques, moving network techniques, cooperative communication techniques, coordinated multi-points (CoMP) techniques, and reception interference cancellation techniques, has been conducted. In addition, for 5G communication systems, hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), sparse code multiple access (SCMA), which are advanced access techniques, have been developed.

The Internet has evolved to an Internet of things (IoT) network that exchanges and processes information between distributed elements such as objects. Internet of everything (IoE) technology is emerging, in which technology related to the IoT is combined with, for example, technology for processing big data through connection with a cloud server. In order to implement the IoT, various technical components are required, such as, a sensing technique, wired/wireless communication, network infrastructures, a service interfacing technique, and a security technique.

Techniques including a sensor network for connecting objects, machine-to-machine (M2M) communication, and machine type communication (MTC) have been studied. In the IoT environment, intelligent Internet technology (IT) services may be provided to collect and interpret data obtained from objects connected to each other, and to create new value in human life. As existing information technology techniques and various industries converge and combine with each other, the IoT may be applied to various fields, such as smart homes, smart buildings, smart cities, smart cars or connected cars, smart grids, health care, smart home appliances, and high quality medical services.

Various attempts are being made to apply 5G communication systems to IoT networks. For example, technologies related to sensor networks, M2M communication, and MTC are implemented by using 5G communication technology including beamforming, MIMO, and array antennas. The application of cloud RAN as a big data processing technique may be an example of the convergence of 5G communication technology and IoT technology.

In general, mobile communication systems have been developed for the purpose of providing communication while securing user mobility. Due to the rapid development of technologies, such mobile communication systems have reached a stage capable of providing not only voice communication services but also high-speed data communication services. The $3^{rd}$ Generation Partnership Project (3GPP) has been standardizing new radio (NR) systems as one of the next-generation mobile communication systems. NR systems are being developed so as to meet various network requirements and achieve a wide range of performance goals. In particular, NR systems are technologies for implementing communication of millimeter wave bands. NR systems may be understood to include 5G NR systems, 4G LTE systems, and LTE-A systems, which support a microwave, including millimeter wave band communication of 6 GHz or more.

SUMMARY

The present disclosure has been made to address the above-mentioned problems and disadvantages, and to provide at least the advantages described below.

In accordance with an aspect of the disclosure, a method performed by a user equipment (UE) is provided. The method includes receiving resource configuration information for a sidelink; identifying a set of slots based on a subcarrier spacing configured for the UE; based on a bitmap included in the resource configuration information, identifying at least one slot for a sidelink resource, among the identified set of slots except specific slots, wherein the specific slots include a slot configured for a sidelink synchronization signal, a slot in which at least one symbol included in a subset of the slot is not configured as an uplink (UL) and a reserved slot; and transmitting a physical sidelink shared channel (PSSCH) on the identified at least one slot.

In accordance with another aspect of the disclosure, a method performed by a base station (BS) is provided. The method includes determining a bitmap for identifying at least one slot for a sidelink resource among a set of slots except specific slots, wherein the set of slots is identified based on a subcarrier spacing configured for a UE; and transmitting resource configuration information including the determined bitmap for a sidelink, wherein the specific slots include a slot configured for a sidelink synchronization signal, a slot in which at least one symbol included in a subset of the slot is not configured as a UL and a reserved slot, and wherein a PSSCH is transmitted, from the UE, on the identified at least one slot.

In accordance with another aspect of the disclosure, a UE is provided. The UE includes a transceiver; and a processor configured to receive, via the transceiver, resource configuration information for a sidelink, identify a set of slots based on a subcarrier spacing configured for the UE, based on a bitmap included in the resource configuration information, identify at least one slot for a sidelink resource, among the identified set of slots except specific slots, wherein the specific slots include a slot configured for a sidelink synchronization signal, a slot in which at least one symbol included in a subset of the slot is not configured as a UL and a reserved slot, and transmit via the transceiver, a PSSCH on the identified at least one slot.

In accordance with another aspect of the disclosure, a BS is provided. The BS includes a transceiver; and a processor configured to determine a bitmap for identifying at least one slot for a sidelink resource among a set of slots except specific slots, wherein the set of slots is identified based on a subcarrier spacing configured for a UE, and transmit, via the transceiver, resource configuration information including the determined bitmap for a sidelink, wherein the specific slots include a slot configured for a sidelink synchronization signal, a slot in which at least one symbol included in a subset of the slot is not configured as a UL and a reserved slot, and wherein a PSSCH is transmitted, from the UE, on the identified at least one slot.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
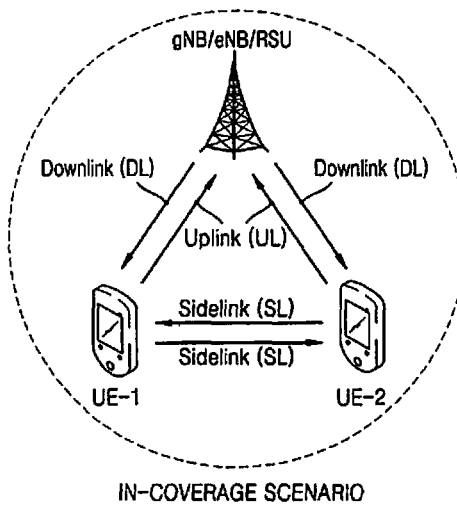
FIG. 1A illustrates an example in which all V2X UEs are located in a coverage area of a BS, according to an embodiment.

The disclosure relates to a wireless communication system, and more particularly, to a method and apparatus for operating a resource pool at a non-contiguous location in a process in which a vehicle terminal supporting V2X communication exchanges information with another vehicle terminal and a pedestrian mobile terminal by using a sidelink.

Throughout the disclosure, the expression "at least one of a, b or c" indicates only a, only b, only c, both a and b, both a and c, both b and c, all of a, b, and c, or variations thereof.

Examples of a terminal may include a UE, a mobile station (MS), a cellular phone, a smartphone, a computer, or a multimedia system capable of performing a communication function.

A controller may also be referred to as a processor.

A layer (or a layer apparatus) may also be referred to as an entity.

In describing the embodiments of the disclosure, technical contents that are well known in the art to which the disclosure belongs and are not directly associated with the disclosure will not be described. By omitting the unnecessary description, the disclosure is conveyed more clearly without obscuring the subject matter of the disclosure.

For the same reason, some elements in the accompanying drawings are exaggerated, omitted, or schematically illustrated. Also, the size of each element does not reflect the actual size. In each drawing, the same reference numerals are assigned to the same or corresponding elements.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

It will be understood that respective blocks of flowcharts and combinations of the flowcharts may be performed by computer program instructions. Because these computer program instructions may be embedded in a processor of a general-purpose computer, a special-purpose computer, or other programmable data processing apparatuses, the instructions executed through the processor of the computer or other programmable data processing apparatus generates modules for performing the functions described in the flowchart block(s). Because these computer program instructions may also be stored in a computer-usable or computer-readable memory that may direct the computer or other programmable data processing apparatus so as to implement functions in a particular manner, the instructions stored in the computer-usable or computer-readable memory are also capable of producing an article of manufacture containing instruction modules for performing the functions described in the flowchart block(s). Because the computer program instructions may also be mounted on the computer or other programmable data processing apparatus, the instructions for executing the computer or other programmable data processing apparatus by generating a computer-implemented process by performing a series of operations on the computer or other programmable data processing apparatus may provide operations for executing the functions described in the flowchart block(s).

Also, each block may represent a part of a module, segment, or code that includes one or more executable instructions for executing a specified logical function(s). It should also be noted that, in some alternative implementations, the functions noted in the blocks may occur out of order. For example, two blocks illustrated in succession may in fact be executed substantially concurrently, or the blocks may sometimes be executed in the reverse order, depending on the functions involved.

The term "module" as used herein refers to a software element or a hardware element such as field programmable gate array (FPGA) or application specific integrated circuit (ASIC), and the term "module" performs certain functions. However, the term "module" is not limited to software or hardware. The term "module" may be configured in an addressable storage medium or may be configured to reproduce one or more processors. Therefore, for example, the term "module" includes elements, such as software elements, object-oriented software elements, class elements, and task elements, processes, functions, attributes, procedures, subroutines, segments of program codes, drivers, firmware, microcodes, circuits, data, databases, data structures, tables, arrays, and variables. Functions provided in the elements and the "module" may be combined with fewer elements and "module" or may be separated from additional elements and "module." In addition, the elements and the "module" may be implemented to reproduce one or more central processing units (CPUs) in the device or secure multimedia card. Also, in embodiments, the "module" may include one or more processors.

Some of the aspects of the disclosure are directed to a new RAN (NR) and a core network, that is, a packet core (5G system, 5G core network, or next generation (NG) core), which are specified by 3GPP. However, the subject matter of the disclosure is applicable to other communication systems having a similar technical background with slight modifications without departing from the scope of the disclosure.

In a 5G system, a network data collection and analysis function (NWDAF), which is a network function of providing a function of analyzing and providing data collected from a 5G network, may be defined so as to support network automation. The NWDAF may collect, store, and analyze information from the 5G network and provide a result of the analyzing to unspecified network functions (NFs). The result of the analyzing may be used independently in each NF.

For convenience of description, some terms and names defined in 3GPP LTE standard (5G, NR, LTE, or similar system standards) may be used. However, the disclosure is not limited by the terms and names and may be equally applied to systems conforming to other standards.

Also, the terms for identifying access nodes, the terms referring to network entities, the terms referring to messages, the terms referring to an interface between network entities, the terms referring to a variety of identification information, as used herein, are provided as an example for convenience of description. Therefore, the disclosure is not limited by the terms used herein, and other terms referring to objects having equivalent technical meanings may be used.

To meet the increase in demand for wireless data traffic after the commercialization of 4G communication systems, considerable efforts have been made to develop improved 5G communication systems (e.g., NR systems). To achieve a high data rate, 5G communication systems are designed to enable communication even in an ultra-high frequency (mm-Wave) band (e.g., a frequency band of 28 GHz). To alleviate propagation path loss of radio waves and to increase propagation distances of radio waves in an ultra-high frequency band, technologies for 5G communication systems, such as beamforming technologies, massive MIMO technologies, FD-MIMO technologies, array antennas technologies, analog beamforming technologies, and large-scale antenna technologies are discussed. In addition, unlike LTE, 5G communication systems support a variety of subcarrier spacing, including 15 kilohertz (kHz), 30 kHz, 60 kHz, and 120 kHz. Also, in 5G communication systems, a physical control channel uses polar coding, and a physical data channel uses a low density parity check (LDPC). In addition, as a waveform for UL transmission, cyclic prefix based orthogonal frequency division multiplex (CP-OFDM), as well as discrete Fourier transform spread orthogonal frequency division multiplex (DFT-S-OFDM), may be used. LTE may support hybrid automatic repeat request (HARQ) retransmission in units of transport blocks (TBs), and 5G may additionally support HARQ retransmission based on code block group (CBG), which combines a plurality of code blocks (CBs).

The application of cloud RAN as a big data processing technique may be an example of the convergence of 5G communication technology and IoT technology. In such communication systems, a plurality of services may be provided to a user. In order to provide such services to the user, there is a need for a method capable of providing each service within the same time period according to features and an apparatus for using the same. Various services provided by the 5G communication systems are being studied, and one of them is a service that satisfies low latency and high reliability requirements.

In the case of vehicle communication, LTE-based V2X has completed standardization work in 3GPP release 14 (Rel-14) and release 15 (Rel-15) based on the D2D communication structure, and efforts have been conducted to develop V2X based on 5G NR. NR V2X is expected to support unicast communication, groupcast (or multicast) communication, and broadcast communication between UEs. Unlike the LTE V2X that aims to transmit and receive basic safety information required for road driving of vehicles, the NR V2X aims to provide more advanced services such as platooning, advanced driving, extended sensors, and remote driving.

A resource pool in a sidelink may be defined as a set of resources in time and frequency domains used for transmission and reception of the sidelink. In an existing LTE system-based sidelink, the resource pool is allowed to be configured to a non-contiguous location in a time domain, but is not allowed to be configured to a non-contiguous location in a frequency domain. A transport channel of the sidelink is designed based on an UL channel. In order to enhance coverage, there is a limitation to allocating resources in contiguous physical resource blocks (PRBs) by using a single carrier based orthogonal frequency division multiplex (SC-OFDM). In the case of the SC-OFDM, when contiguous resource allocation is performed, a peak to average power ratio (PAPR) is maintained to be low, thereby enhancing coverage. However, because the NR system-based sidelink basically supports CP-OFDM, it is difficult to keep PAPR low even when resources are allocated contiguously in a frequency domain.

Therefore, when the CP-OFDM is considered in the NR system-based sidelink, it is necessary to allow non-contiguous resource allocation in a frequency domain in order to allow for more flexible resource allocation. For example, even when transmission is possible at some resource locations in a frequency domain, all frequency resources may not be used when non-contiguous resource allocation is not allowed in a frequency domain. Also, unlike the existing LTE system, the NR system may support time resource allocation more flexibly. For example, the LTE system supports TDD through seven UL and downlink (DL) subframe configurations, but the NR system may configure UL, DL and time resources more flexibly through a slot format configuration in units of slots and symbols. The NR system may flexibly be reconfigured to an UL and a DL when necessary. Therefore, a method of configuring the resource pool to a non-contiguous location in a time domain by taking into account the channel structure considered in the NR sidelink has to be considered.

In the NR sidelink, unlike the LTE sidelink described above, a method of configuring a resource pool at a non-contiguous location in time and frequency domains has to be considered. Therefore, for this purpose, a resource pool may be first configured at a non-contiguous location in a frequency domain, and the configured resource pool may be divided into a plurality of sub-channels. Also, a UE operation method and apparatus for configuring a resource pool at a non-contiguous location in a time domain by taking into account an NR sidelink structure is provided herein.

An embodiment configures a resource pool at a non-contiguous location in time and frequency domains. A method and apparatus related to a resource pool configuration in an NR sidelink system are provided.

FIGS. 1A to 1D illustrate examples of systems describing an embodiment.

FIG. 1A illustrates an example in which all V2X UEs (UE-1 and UE-2) are located in coverage area of a BS (i.e., within a coverage area of the BS).

All the V2X UEs may receive data and control information from the BS via a DL or transmit data and control information to the BS via a UL. In this case, the data and the control information may be data and control information for V2X communication. The data and the control information may be data and control information for general cellular communication. Also, the V2X UEs may transmit and receive data and control information for V2X communication via a sidelink.

Figure 1B:
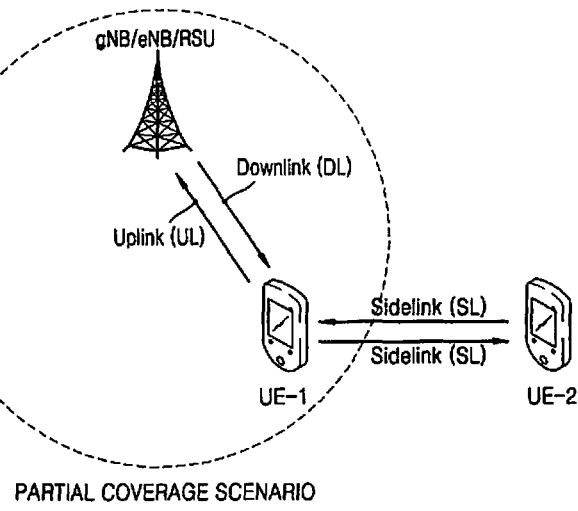
FIG. 1B illustrates an example in which UE-1 is located in a coverage area of a BS and UE-2 is located outside the coverage of the BS, according to an embodiment.

FIG. 1B illustrates an example in which the UE-1 is located in the coverage area of the BS and the UE-2 is located outside the coverage area of the BS. The example illustrated in FIG. 1B may be referred to as an example of partial coverage.

The UE-1, which is located in the coverage area of the BS, may receive data and control information from the BS via a DL or transmit data and control information to the BS via a UL.

The UE-2, which is located outside the coverage area of the BS, may not receive data and control information from the BS via a DL and may not transmit data and control information to the BS via a UL.

The UE-2 may transmit and receive data and control information for V2X communication to and from the UE-1 via a sidelink.

Figure 1C:
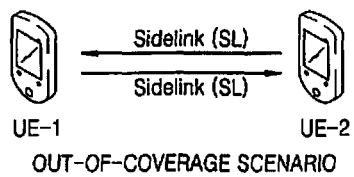
FIG. 1C illustrates an example in which all V2X UEs are located out of a coverage area of BS, according to an embodiment.

FIG. 1C illustrates an example in which all V2X UEs are located out of coverage area of a BS.

Because the UE-1 and the UE-2 are located out of the coverage area of the BS, the UE-1 and the UE-2 may not receive data and control information from the BS via a DL and may not transmit data and control information to the BS via a UL.

The UE-1 and the UE-2 may transmit and receive data and control information for V2X communication via a sidelink.

Figure 1D:
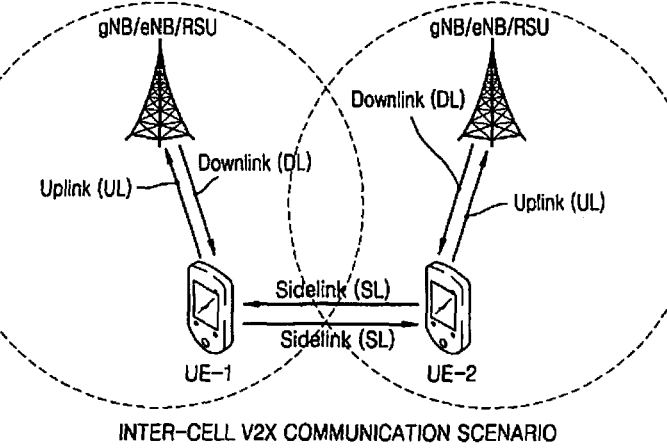
FIG. 1D illustrates an example of performing V2X communication between UEs located in different cells, according to an embodiment.

FIG. 1D illustrates an example of performing V2X communication between UEs located in different cells. Specifically, FIG. 1D illustrates an example in which a V2X transmitting UE and a V2X receiving UE are connected to different BSs (radio resource control (RRC) connected state) or camps (RRC connection release state, that is, RRC idle state). In this case, the UE-1 may be the V2X transmitting UE and the UE-2 may be the V2X receiving UE.

According to another example, the UE-1 may be the V2X receiving UE and the UE-2 may be the V2X transmitting UE. The UE-1 may receive a V2X dedicated SIB from the BS to which the UE-1 is connected (or on which the UE-1 camps), and the UE-2 may receive a V2X dedicated SIB from another BS to which the UE-2 is connected (or on which the UE-2 camps). In this case, information about the V2X dedicated SIB received by the UE-1 and information about the V2X dedicated SIB received by the UE-2 may be different from each other. Therefore, in order to perform V2X communication between UEs located in different cells, information may be unified, or a more flexible parameter configuration may be supported through a parameter configuring method and apparatus according to the disclosure.

The UL and the DL between the BS and the V2X UEs may be referred to as a Uu interface, and the sidelink between the V2X UEs may be referred to as a PC5 interface. Therefore, in the disclosure, these may be used interchangeably with each other.

The UE may refer to a vehicle that supports V2V communication, a vehicle or a pedestrian's handset (i.e., a smartphone) that supports vehicle-to-pedestrian (V2P) communication, a vehicle that supports vehicle-to-network (V2N) communication, or a vehicle that supports vehicle-to-infrastructure (V2I) communication. Also, the UE may refer to a road side unit (RSU) having a UE function, an RSU having a BS function, or an RSU having a part of the BS function and a part of the UE function.

Furthermore, the BS may refer to a BS that supports both V2X communication and general cellular communication, or a BS that supports only V2X communication. In this case, the BS may refer to a 5G BS (gNB), a 4G BS (eNB), or an RSU. Unless otherwise specified, the BS and the RSU may be used and configured similarly.

Figure 2:
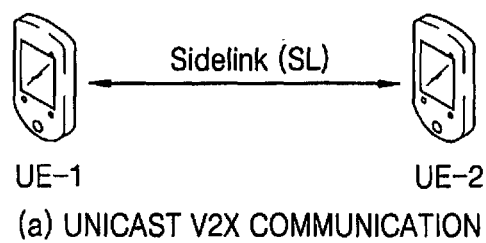
FIG. 2 illustrates methods of V2X communication performed through a sidelink, according to an embodiment.
Figure 2:
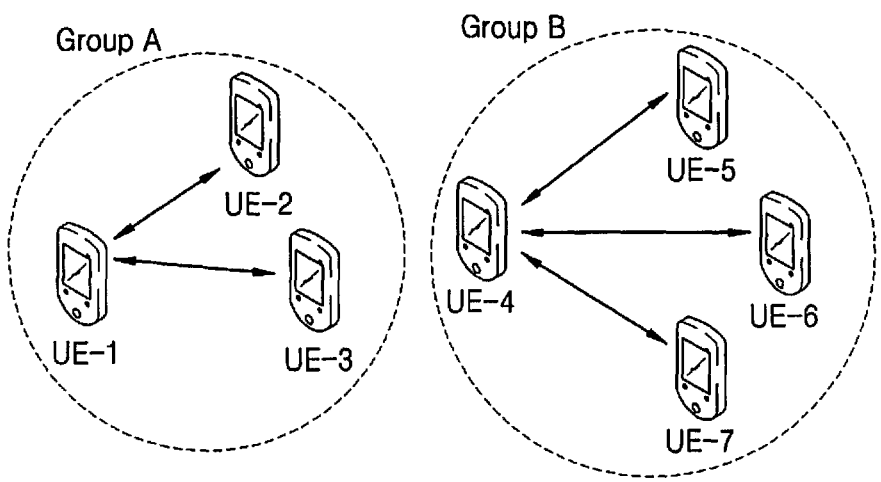

FIG. 2 illustrates methods of V2X communication performed via a sidelink.

Referring to FIG. 2, as illustrated in (a), a transmission (TX) UE and a reception (RX) UE may perform one-to-one communication, which may be referred to as unicast communication.

As illustrated in (b), a TX UE and an RX UE may perform one-to-many communication, which may be referred to as groupcast or multicast communication.

A UE-1, a UE-2, and a UE-3 may form a single group (group A) to perform groupcast communication, and a UE-4, a UE-5, a UE-6, and a UE-7 may form another group (group B) to perform groupcast communication. Each UE may perform groupcast communication only within a group to which each UE belongs, and may not perform communication between different groups. As shown in (b), two groups may be formed. A situation of performing one-to-many communication is not limited to the above-described example.

V2X UEs may perform broadcast communication. The broadcast communication refers to a case in which all V2X UEs receive data and control information that a V2X transmitting UE transmits via a sidelink. For example, in FIG. 2B, when it is assumed that the UE-1 is a transmitting UE for broadcast, all the UEs (UE-2, UE-3, UE-4, UE-5, UE-6, and UE-7) may receive data and control information transmitted by the UE-1.

In an NR V2X, unlike an LTE V2X, the support of a vehicle terminal that transmits data to only one specific node through unicast and a vehicle terminal that transmits data to a plurality of specific nodes through groupcast may be considered. For example, in the case of a service scenario such as platooning, which is technology that allows two or more vehicles to be connected via a single network and bundled and moved in a cluster, unicast and group casting techniques may be used. Specifically, unicast communication may be required in order for a leader node of a group connected by platooning to control a single specific node, and groupcast communication may be required in order to simultaneously control a group of a plurality of specific nodes.

Figure 3:
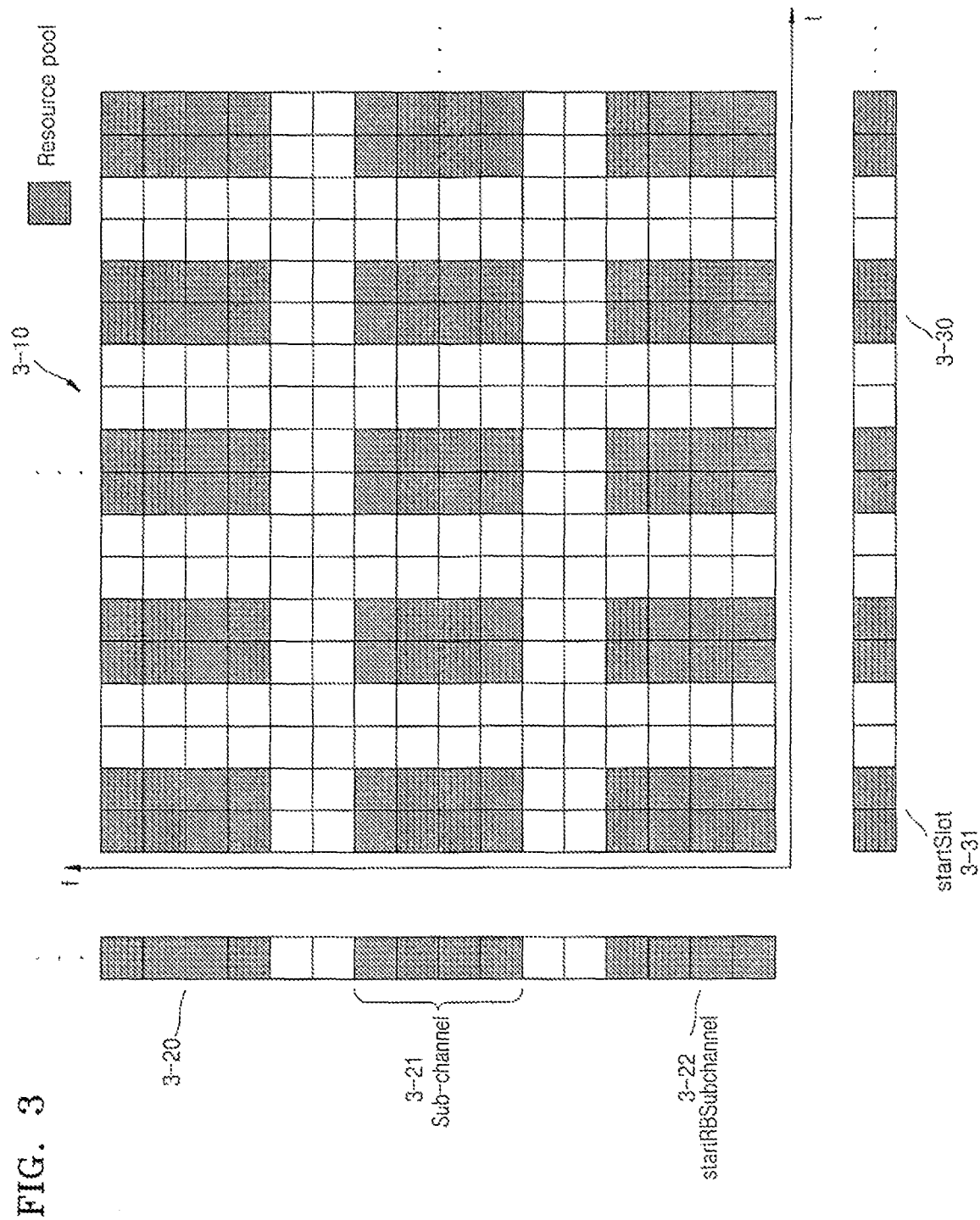
FIG. 3 is a diagram for describing a resource pool that is defined as a set of resources in time and frequency domains, which are used for transmission and reception of a sidelink, according to an embodiment.

FIG. 3 is a diagram for describing a resource pool defined as a set of resources in time and frequency domains, which are used for transmission and reception of a sidelink, according to an embodiment.

Referring to FIG. 3, reference numeral 3-10 illustrates an example of a case in which resource pools are allocated non-contiguously in time and frequency domains. Although the disclosure focuses on the case in which the resource pools are allocated non-contiguously in a frequency domain, the resource pools may be allocated contiguously in a frequency domain.

Reference numeral 3-20 of FIG. 3 illustrates an example of a case in which non-contiguous resource allocation in a frequency domain is performed.

Reference numeral 3-21 of FIG. 3 illustrates an example of a case in which resource allocation in a frequency domain is performed based on sub-channels. The sub-channel may be defined in units including a plurality of resource blocks (RBs) in a frequency domain. In other words, the sub-channel may be defined as an integer multiple of RB. Reference numeral 3-21 of FIG. 3 illustrates an example of a case in which the size of the sub-channel is four consecutive PRBs. In general, the size of the sub-channel may be configured differently and the single sub-channel may include consecutive PRBs. However, the sub-channel may not necessarily include consecutive PRBs. The sub-channel may be a basic unit of resource allocation for a PSSCH or a physical sidelink control channel (PSCCH). Therefore, the size of the sub-channel may be set differently according to whether the corresponding channel is a PSSCH or a PSCCH. Also, the term "sub-channel" may be used interchangeably with another term such as an RB group (RBG). Methods of allocating a non-contiguous resource pool in a frequency domain and dividing the non-contiguous resource pool into a plurality of sub-channels will now be described.

startRBSubchanel 3-22 of FIG. 3 indicates a start location of a sub-channel in a frequency domain in the resource pool.

Reference numeral 3-30 of FIG. 3 illustrates an example of a case in which non-contiguous resource allocation in a time domain is performed. Reference numeral 3-30 of FIG. 3 illustrates a case in which resource allocation in a time domain is performed based on slots. However, the resource allocation in a time domain is not limited to "based on slots." For example, a method of allocating resources based on a subset of contiguous symbols in the slot rather than based on all symbols in the slot may be considered. Although the disclosure focuses on the case in which the resource pools are allocated non-contiguously in a time domain, the resource pools may be allocated contiguously in a time domain.

startSlot 3-31 of FIG. 3 indicates a start location of a slot in a time domain in the resource pool.

Next, resource allocation methods may be classified into two types, that is, scheduled resource allocation (mode 1) and UE autonomous resource allocation (mode 2), according to a method by which a BS allocates resources to a UE for V2X sidelink communication. In the case of the scheduled resource allocation (mode 1), a BS allocates resources used for sidelink transmission to RRC-connected UEs in a dedicated scheduling scheme. The scheduled resource allocation method is effective for interference management and resource pool management (dynamic allocation and semi-persistence transmission) because the BS is capable of managing the resources of the sidelink. Also, in the case of the scheduled resource allocation (mode 1) in which the BS allocates and manages resources for V2X, when there is data to be transmitted to other UEs by the RRC-connected UE, data may be transmitted to the BS by using an RRC message or a multimedia access control (MAC) control element (CE). A SidelinkUEInformation message and a UEAssistanceInformation message may be used as the RRC message. The MAC CE may be, for example, a buffer status report MAC CE of a new format (including at least an indicator indicating a buffer status for V2P communication and information about the size of data buffered for D2D communication). For the detailed format and contents of the buffer status report used in 3GPP, 3GPP Specification TS 36.321 "E-UTRA MAC Protocol Specification" is referred to. In the UE autonomous resource allocation (mode 2), the BS provides a sidelink transmission and reception resource pool for V2X as system information, and the UE selects a resource pool according to a certain rule. The resource selection method may include zone mapping, sensing-based resource selection, and random selection. The scheduled resource allocation (mode 1) and the UE autonomous resource allocation (mode 2) in the NR system will now be described.

According to an embodiment, a method of indicating information about a location of a non-contiguous resource pool in a frequency domain through a bitmap is provided. First, information about the location of the resource pool in a frequency domain may be represented by bitmap information (b0, b1, . . . , bi, . . . , bLbitmap−1) together with configured sidelink bandwidth part (SL BWP) information.

When bi=1, it may indicate an area configured as a resource pool in a frequency domain, and when bi=0, it may indicate an area not configured as a resource pool in a frequency domain. Physical location information including the start location of the resource pool in a frequency domain may be identified through the bitmap. Also, Lbitmap is the length of the bitmap and may be determined by the following methods.

Bitmap length configuring method 1:

Lbitmap may be determined by a maximum number of transmittable RBs determined by a subcarrier spacing (SCS) and a configured channel bandwidth. Table 1 and Table 2, shown below, illustrate a maximum number of transmittable RBs according to an SCS and a configured bandwidth defined in an NR Uu.

For example, referring to Table 1, when the channel bandwidth is 40 MHz and the SCS is 15 kHz, the maximum number of transmittable RBs is 216. Therefore, Lbitmap is 216.

The location of the resource pool in a frequency domain indicated in the actual bitmap is generated within the area of the configured SL BWP. Therefore, when the length of the SL BWP is very small as compared with the channel bandwidth, information about the location of the resource pool in a frequency domain may be displayed only on a partial area of the bitmap.

Bitmap length configuring method 2:

Lbitmap may be determined as the length of the configured SL BWP. Information about the configured SL BWP may include a physical start location (PRB) and a length (number of RBs) of the SL BWP.

For example, when the length of the SL BWP has a bandwidth of 50 RBs, Lbitmap is 50.

Bitmap length configuring method 3:

Lbitmap may be a fixed value, and the unit indicated by one bit in the Lbitmap bit may be determined based on a value obtained by dividing the total system bandwidth or the size N of the SL BWP including the resource pool by Lbitmap. For example, the unit indicated by one bit may be $\lceil N/L_{bitmap} \rceil$ RBs, and the unit indicated by the last bit may be $$N - \left\lceil \frac{N}{L_{bitmap}} \right\rceil \times (N-1).$$

For convenience of description, it is assumed that the unit indicated by one bit is 1 RB. However, the disclosure is not limited thereto. As in the bitmap length configuring method 3, the disclosure may also be applied to a case in which the unit indicated by one bit is N RBs. In this case, N may be a value determined according to the BS configuration or may be a value determined according to the total system frequency bandwidth or the size of the BWP in which the resource pool is configured.

TABLE 1

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Maximum transmission bandwidth configuration NRB in FR1 [TS 38.101-1]

TABLE 2

| Maximum transmission bandwidth configuration NRB in FR2 [TS 38.101-2] | | | | |
|---|---|---|---|---|
| SCS (kHz) | 50 MHz $N_{RB}$ | 100 MHz $N_{RB}$ | 200 MHz $N_{RB}$ | 400 MHz $N_{RB}$ |
| 60 | 66 | 132 | 264 | N.A |
| 120 | 32 | 66 | 132 | 264 |

As described above, information about the location of the non-contiguous resource pool in a frequency domain through the bitmap may be indicated through sidelink system information bit (SL SIB) or UE-specific higher signaling. In this case, the information about the location of the non-contiguous resource pool in a frequency domain may be indicated as preset information considering a sidelink communication environment in a case in which the UE is in the BS coverage and a case in which the UE is out of the BS coverage.

Specifically, when the UE is out of the BS coverage, preset resource pool information in a frequency domain may be indicated by the bitmap. This is done for the UE to configure a resource pool preset for communication with the UE, which is out of the BS coverage, so as to enable the transmission and reception of SL in the corresponding resource. In contrast, when the UE is in the coverage, the BS may indicate the preset resource pool information in a frequency domain by the bitmap, or the BS may indicate the directly set resource pool information in a frequency domain by the bitmap.

The method for the resource pool having the non-contiguous PRBs has been described, but the disclosure is not limited thereto. the disclosure may be equally applied to resource pools having contiguous PRBs.

According to an embodiment, a method of dividing information about a location of a non-contiguous resource pool in a frequency domain into a plurality of sub-channels when the information about the location of the non-contiguous resource pool in a frequency domain is indicated through the bitmap will be described. A sub-channel configuring method may include identifying PRB, which is physical location information of the non-contiguous resource pool in a frequency domain, through a bitmap and mapping the PRB to a logical resource block (LRB).

Figure 4:
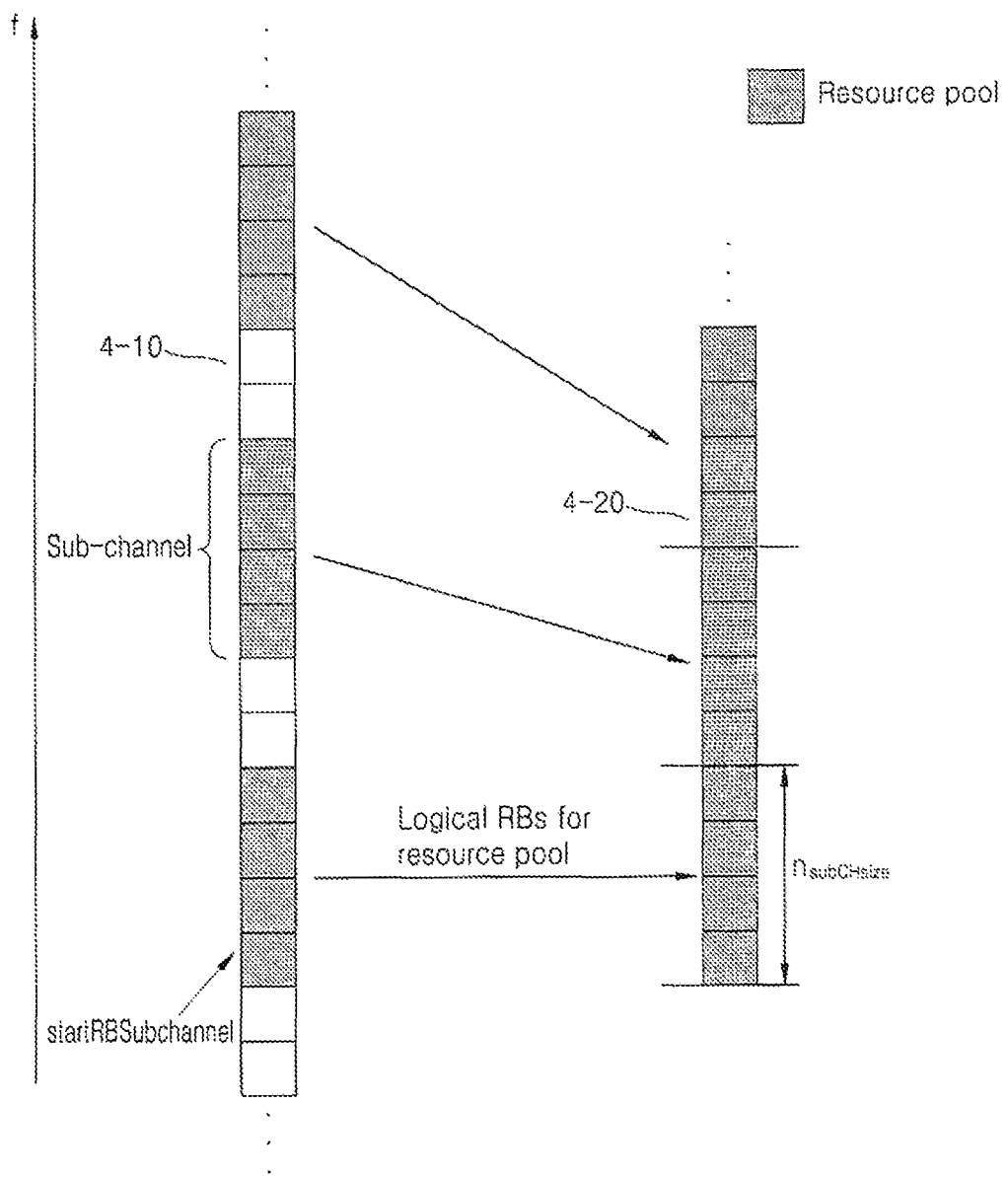
FIG. 4 is a diagram for describing a method of dividing information about a location of a non-contiguous resource pool in a frequency domain into a plurality of sub-channels when information about the location of the non-contiguous resource pool in a frequency domain is indicated, according to an embodiment.

FIG. 4 is a diagram for describing a method of dividing information about the location of the non-contiguous resource pool in a frequency domain into a plurality of sub-channels when the information about the location of the non-contiguous resource pool in a frequency domain is indicated, according to an embodiment.

Referring to FIG. 4, reference numeral 4-10 illustrates a PRB in which the non-contiguous resource pool in a frequency domain is located. Reference numeral 4-20 of FIG. 4 illustrates a result of mapping the PRB to an LRB. The term "LRB" may be used interchangeably with virtual resource block (VRB). More specifically, LRB is a result of separating only portions configured as bi=1 and sequentially mapping the portions. Therefore, the length of the LRB is the number of RBs configured in the actual resource pool in a frequency domain. Also, the sub-channel configuring method includes allocating the LRB to the sub-channel.

When the resource pool includes NsubCH sub-channels in an SL BWP, an index nLRB(m) of the LRB corresponding to the sub-channel m (m=0, 1, . . . , NsubCH−1) may be represented by Equation (1). The index of the LRB may be referred to as an LRB number.

$$nLRB(m) = m^* nsubCHsize + j, \quad \text{Equation (1)}$$

$$\text{for } j = 0, 1, \ldots, nsubCHsize - 1$$

nsubCHsize indicates the size of the sub-channel and may be configured to one or more RBs. Also, NsubCH and nsubCHsize may be indicated by higher signaling. When the sub-channel dividing method is used, it is necessary to allocate and map each sub-channel to an LRB number in the resource pool corresponding to a PSSCH or a PSCCH and interpret the LRB number as a PRB number. The LRB number may be interpreted as the PRB number through the information about the location of the non-contiguous resource pool in a frequency domain indicated through the bitmap. That is, information about PRBs belonging to the corresponding resource pool may be determined based on (b0, b1, . . . , bi, . . . , bLbitmap−1). For example, nLRB-to-PRB (k) may be defined as a PRB index or a PRB number corresponding to a $k^{th}$ LRB. In this case, when (b0, b1, . . . , bi, . . . , bLbitmap−1) is given, the relational expression of $\Sigma_{i=0}^{nLRB\text{-}to\text{-}PRB(k)-1} b_i = k$ may be satisfied.

When different sizes are configured to different sub-channels, the index nLRB(m) of the LRB corresponding to the sub-channel m (m=0, 1, . . . , NsubCH−1) may be modified as follows in Equation (2).

$$nLRB(m) = m^* nsubCHsize(m) + j, \quad \text{Equation (2)}$$

$$\text{for } j = 0, 1, \ldots, nsubCHsize(m) - 1$$

nsubCHsize(m) indicates a size of an $m^{th}$ sub-channel and may be configured to one or more RBs. Therefore, unlike in Equation (1), m nsubCHsizes may be indicated by higher signaling.

In an embodiment, a method of dividing information about a location of a non-contiguous resource pool in a frequency domain into a plurality of sub-channels when the information about the location of the non-contiguous resource pool in a frequency domain is indicated through the bitmap will be described. This embodiment does not include identifying PRBs, which is physical location information about the non-contiguous resource pool, and mapping the PRBs to LRBs. However, the sub-channel may include always contiguous PRBs. When the resource pool includes NsubCH sub-channels in the SL BWP and the sub-channel includes contiguous PRBs, the PRB corresponding to the sub-channel m (m=0, 1, . . . , NsubCH−1) may be represented by Equation (3-1).

$$nPRB = nsubCHRBstart(m) + j, \quad \text{Equation (3-1)}$$

$$\text{for } j = 0, 1, \ldots, nsubCHsize - 1$$

nsubCHsize indicates the size of the sub-channel and may be configured to one or more RBs. Also, NsubCH and nsubCHsize may be indicated by a higher layer. nsubCHRBstart(m) indicates a start location of an $m^{th}$ sub-channel, which may be known through information about the location of the non-contiguous resource pool in a frequency domain indicated through the bitmap. Therefore, when the method of Equation (3-1) is used, it is necessary to receive information about the location of the non-contiguous resource pool in a frequency domain as bitmap information. Also, it is necessary to allocate the resource pool corresponding to the PSSCH or the PSCCH to the PRB number corresponding to the start location for each sub-channel and interpret the PRB number.

When different sizes are configured to different sub-channels, the index nPRB of the PRB corresponding to the sub-channel m (m=0, 1, . . . , NsubCH–1) may be modified as follows from Equation (3-2).

$$nPRB = nsubCHRBstart(m) + j, \quad \text{Equation (3-2)}$$
$$\text{for } j = 0, 1, \ldots, nsubCHsize(m) - 1$$

nsubCHsize(m) indicates a size of an $m^{th}$ sub-channel and may be configured to one or more RBs. Therefore, unlike Equation (3-1), m nsubCHsizes may be indicated by higher signaling.

In an embodiment, a method of indicating a start location of each sub-channel with respect to a non-contiguous resource pool without indicating the information about the location of the non-contiguous resource pool through the bitmap may be used. Therefore, the sub-channel configuring method may include indicating a start location of each sub-channel. This will be described in detail below with reference to FIG. 5.

Figure 5:
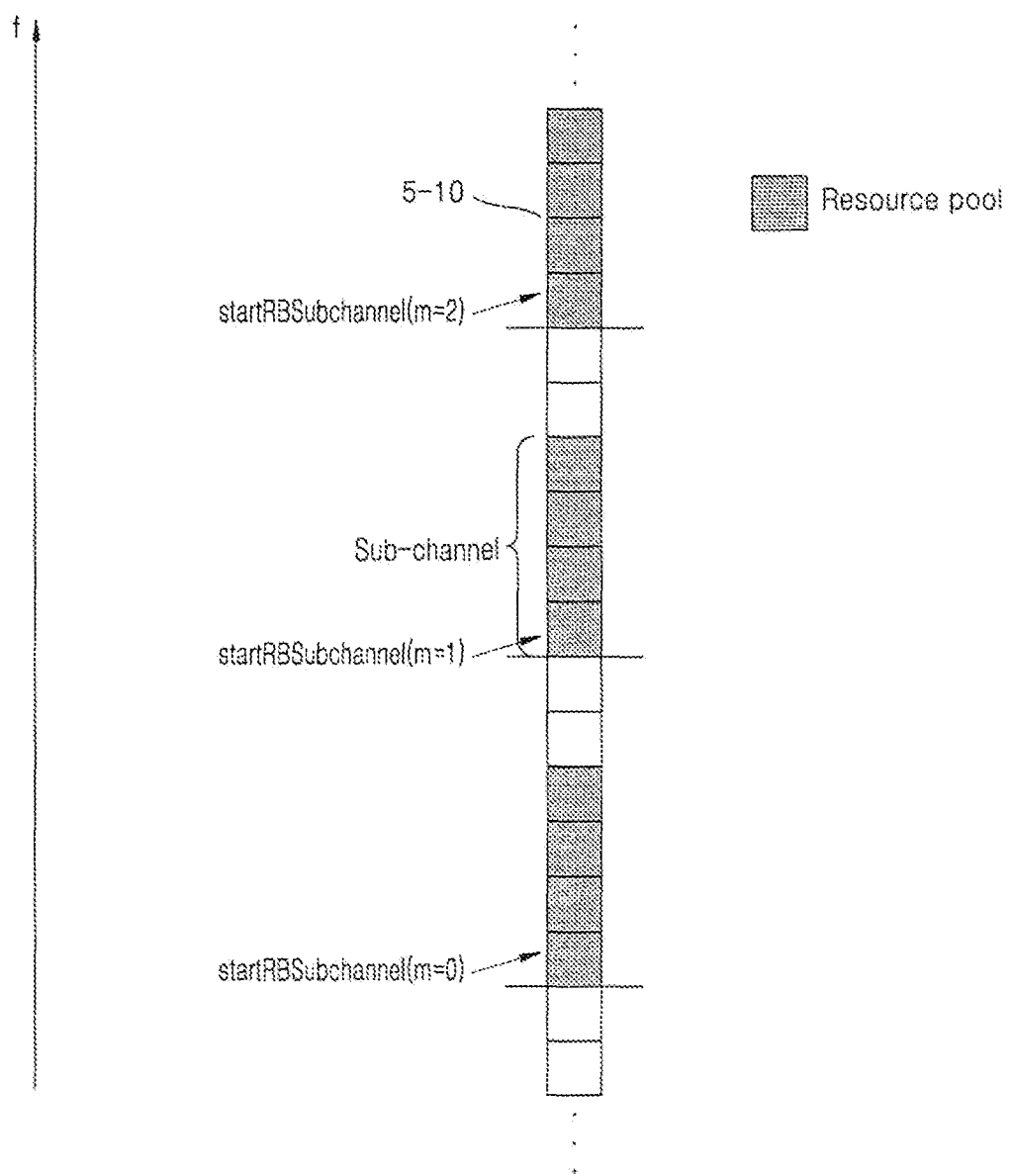
FIG. 5 is a diagram for describing a method of indicating a start location of each sub-channel with respect to a non-contiguous resource pool, according to an embodiment.

FIG. 5 is a diagram for describing a method of indicating a start location of each sub-channel with respect to a non-contiguous resource pool, according to an embodiment.

Referring to FIG. 5, reference numeral 5-10 illustrates a PRB in which the non-contiguous resource pool in a frequency domain is located. When the resource pool includes NsubCH non-contiguous sub-channels in an SL BWP, the location of the non-contiguous resource in a frequency domain may be identified by indicating startRBSubchannel, which is physical location information about each sub-channel. Such information may be indicated through SL SIB or UE-specific higher signaling. The method may assume that the sub-channel includes always contiguous PRBs. When the resource pool includes NsubCH non-contiguous sub-channels in the SL BWP, the PRB corresponding to the sub-channel m (m=0, 1, . . . , NsubCH–1) may be represented by Equation (4-1).

$$nPRB = nsubCHRBstart(m) + j, \quad \text{Equation (4-1)}$$
$$\text{for } j = 0, 1, \ldots, nsubCHsize - 1$$

nsubCHsize indicates the size of the sub-channel and may be configured to one or more RBs. Also, NsubCH and nsubCHsize may be indicated by a higher layer. nsubCHRBstart(m) indicates a start location in a frequency domain corresponding to the sub-channel m. Therefore, when the method of Equation (4-1) is used, it is necessary to receive information about the start location for each sub-channel in the non-contiguous resource pool in a frequency domain in the SL BWP. Also, it is necessary to allocate the resource pool corresponding to the PSSCH or the PSCCH to the PRB number corresponding to the start location for each sub-channel and interpret the PRB number.

When different sizes are configured to different sub-channels, the index nPRB of the PRB corresponding to the sub-channel m (m=0, 1, . . . , NsubCH–1) may be modified as follows from Equation (4-2).

$$nPRB = nsubCHRBstart(m) + j, \quad \text{Equation (4-2)}$$
$$\text{for } j = 0, 1, \ldots, nsubCHsize(m) - 1$$

nsubCHsize(m) indicates a size of an $m^{th}$ sub-channel and may be configured to one or more RBs. Therefore, unlike Equation (4-1), m nsubCHsizes may be indicated by higher signaling.

According to an embodiment, a method of indicating information about a location of a non-contiguous resource pool in a time domain through a bitmap is provided. First, information about the location of the resource pool in a time domain may be represented by bitmap information (b0, b1, . . . , bi, . . . , bLbitmap–1). When bi=1, it may indicate an area configured as a resource pool in a time domain, and when bi=0, it may indicate an area not configured as a resource pool in a time domain. Also, Lbitmap is the length of the bitmap and may be determined according to a slot format. According to the slot format, a UL, a DL, and time resources may be configured more flexibly in units of slots and symbols. Physical location information including the start location of the resource pool in a time domain may be identified through the bitmap.

As explained, slot format indicates uplink, downlink and flexible resources in the unit of slot or symbol. For example, this information may be indicated to the UE in the sidelink from the base station by an SIB or may be (pre-)configured by resource pool information.

As described above with reference to FIG. 3, the following two methods may be considered for resource allocation in a time domain.

Method 1 of allocating resources in a time domain 1:
Resource allocation in a time domain is performed according to all symbols of slot based on slot.
Method 2 of allocating resources in a time domain:
Resource allocation is performed based on subset of contiguous symbols of slot, not based on all symbols of slot.
Method 2 may not be considered for use in an intelligent transport system (ITS) band.

When Method 2 is considered, information about the corresponding subset is not dynamically indicated to the UE. The information about the subset may be the number of symbols of the subset and location information about the subset in the slot.

The number of symbols of the subset and the location information may be pre-configured in the resource pool. When the subset is dynamically indicated to the UE and the subset information is changed, a problem may occur in a process in which the UE performs sensing for resource selection in a sidelink communication.

Although Method 1 for resource allocation in a time domain and Method 2 for resource allocation in a time domain have been separately described, the start location of the symbol allocated to the PSSCH and the length of the symbol may be pre-configured in the resource pool.

In the present embodiment and subsequent embodiments, Method 1 for resource allocation in a time domain is assumed for convenience of description, but the disclosure is not limited thereto.

The BS may commonly indicate the configuration of the slot format to UEs that have received the configuration through SL SIB in units of A slots. A indicates a period in which the slot format is configured, and the slot format configured in units of A may be repeated in a time domain. However, the slot format configured through the SL SIB may be changed later through the RRC configuration of the BS or the SL PC5 RRC configuration of the UE. In this case, it is possible to reconfigure the slot corresponding to the UL and the DL in the currently configured slot format.

Also, it is possible to change the slot format through downlink control information (DCI) transmitted by the BS or sidelink control information (SCI) transmitted via the sidelink by the UE. In this case, it is possible to reconfigure the slot corresponding to flexible to the UL and the DL in the currently configured slot format. The configuration of the final slot format in the sidelink may be changed according to whether the UE is in or out of BS coverage and whether the data transmission is in a broadcast mode or in a unicast and groupcast mode. Specifically, when the UE is out of the BS coverage, it is impossible to change the slot format from the BS RRC configuration. Also, even when the UE is in the broadcast mode and there is no PC5 RRC connection of the sidelink between UEs, it is impossible to change the slot format from the PC5 RRC configuration. Because the sidelink is a channel transmitted by the UE, a channel configured as a UL in the slot format may be used as the sidelink channel. Therefore, in the bitmap (b0, b1, . . . , bi, . . . , bLbitmap−1) indicating the information about the location of the resource pool in a time domain, Lbitmap may be determined as a ratio of slots configured as the UL of the slot format. The following methods may be considered may be applied.

Method 1 of allocating resources in a time domain:
In the case of FDD, slots in which all or part of slots are configured as flexible may be excluded from the finally configured slot format.
In the case of TDD, slots in which all or part of slots are configured as a DL or flexible may be excluded in the finally configured slot format.

Method 2 of allocating resources in a time domain:
In the case of FDD, slots in which all slots are configured as flexible may be excluded from the finally configured slot format.
In the case of TDD, slots in which all slots are configured as a DL or flexible may be excluded in the finally configured slot format.

Therefore, when the slot format is indicated in units of A slots in the SL, a ratio of slots occupied by the UL in the A slots may be Lbitmap. For example, when all A slots are configured as a UL, Lbitmap=A. In contrast, when only half of the A slots are configured as a UL, Lbitmap=A/2.

In another example, the sidelink UE may be configured with slot format information of uplink, downlink and flexible resources in the unit of slot or symbol from the BS by an SIB or the slot format information may be (pre-)configured by resource pool information. In addition, the UE may transmit a sidelink transmission only in the slots or symbols configured as an uplink.

An index of slot tk in which a PSSCH is transmitted via a sidelink is an area configured as bi=1 and i=kmodulo (Lbitmap) in the bitmap (b0, b1, . . . , bi, . . . , bLbitmap−1), which is the information about the location of the resource pools in a time domain.

In other words, the slot tk satisfying the above condition belongs to the resource pool. The index of slot tk is determined based on slot number 0 of a radio frame corresponding to a system frame number (SFN) index 0. In contrast, when the synchronization is based on GPS or GNSS, the slot index tk is determined based on slot number 0 of a radio frame corresponding to a direct frame number (DFN) index 0, k is defined as a value belonging to the following range:

$$0 = k < (10240 * N - Nslss - Ncsirs - Ndfs - Nreserved)$$

10240*N indicates the maximum range to which the resource pool is repeatedly applied on the configured time, and thus, may be represented as 0≤tk≤10240*N. In the NR sidelink system, 10240*N may be changed to another value. After 10240*N, a newly configured resource pool in a time domain may be applied.

The value of N may be set as follows:
N=1: This case is a method that does not consider SCS.
N=$2^\mu$: This case is a method of maintaining the range (slot unit) of the value of k constantly in a time domain, regardless of SCS.
N=$2^{-\mu}$: This case is a method of reducing the range (slot unit) of the value of k by $2^\mu$ times in the time domain because the length of the slot interval in the time domain is reduced.

μ is an index corresponding to numerology and may be configured according to the following value based on SCS:

$$SCS = 15 \text{ kHz}, \mu = 0$$
$$SCS = 30 \text{ kHz}, \mu = 1$$
$$SCS = 60 \text{ kHz}, \mu = 2$$
$$SCS = 120 \text{ kHz}, \mu = 3$$

Nslss indicates slots through which a sidelink synchronization signal is transmitted, which may be excluded from the slot tk through which the PSSCH is transmitted.

Ncsirs indicates slots through which a sidelink channel state information reference signal (CSI-RS) is transmitted, which may be excluded from the slot tk through which the PSSCH is transmitted. When this is not considered, Ncsirs=0.

Ndfs indicates slots that may not transmit the sidelink signal in the slot format. As described above, in the case of FDD, Ndfs refers to slots in which all or part of slots are configured as flexible in the finally configured slot format. In the case of TDD, Ndfs refers to slots in which all or part of slots are configured as a DL or flexible in the last configured slot format. This may be excluded from the slot tk in which the PSSCH is transmitted. When the slots corresponding to Ndfs are not present, Ndfs=0. Specifically, when the UE transmits a sidelink transmission as part of uplink symbols within a slot, the available slot for sidelink transmission may be the slot for which the number of uplink symbols is larger than a threshold. In other word, the unavailable slot for sidelink transmission, discussed above, may be the slot for which the number of uplink symbols (X) is smaller than threshold X' symbols, or the slot may be a slot where the number of downlink or flexible symbols (Y) is larger than threshold Y' symbols. If X≤X' (or X<X'), the corresponding slot may be a slot in which sidelink transmission is not possible. If Y≥Y' (or Y>Y'), the corresponding slot may be a slot in which sidelink transmission is not possible. In this case, the threshold X' or Y' value may be (pre-)configured in the resource pool.

Nreserved indicates reserved slots configured so as to set the size of 10240, which is the maximum range to which the resource pool is repeatedly applied on the configured time.

The UE may determine a temporal location at which a sidelink resource is transmitted and transmit the resource at the corresponding location. As an example, the BS may indicate TDD configuration information about the sidelink through a physical sidelink broadcast channel (PSBCH). The TDD configuration information may be DL, UL, and flexible slot information. In the sidelink, the UE may transmit sidelink resources in a slot that the BS configures as a cell-specific uplink. Next, the UE may indicate bitmap information (b0, b1, . . . , bi, . . . , bLbitmap−1), which is location information about the resource pool in a time domain, through sidelink SIB information. For example, Lbitmap=100 bits. The slot tk through which the PSSCH is transmitted via the sidelink is an area where bi=1 and i=kmodulo(Lbitmap) in the bitmap (b0, b1, . . . , bi, . . . , bLbitmap−1), which is resource pool location information in a time domain. In this case, tk may be represented by a range of 0≤tk≤10240*N. As described above, the value of N may be determined considering the SCS. In addition, the symbol location at which the PSSCH is transmitted in the slot configured as the resource pool may be interpreted from the start location and the symbol length of the PSSCH symbol configured in the resource pool. Based on the above interpretation, the UE may transmit the PSSCH in at least some symbols of the slot configured as the resource pool of the sidelink.

The method for the non-contiguous resource pool in a time domain has been provided, but this is merely an example. The above-described method may be equally applied to contiguous resource pools in a time domain.

Figure 6:
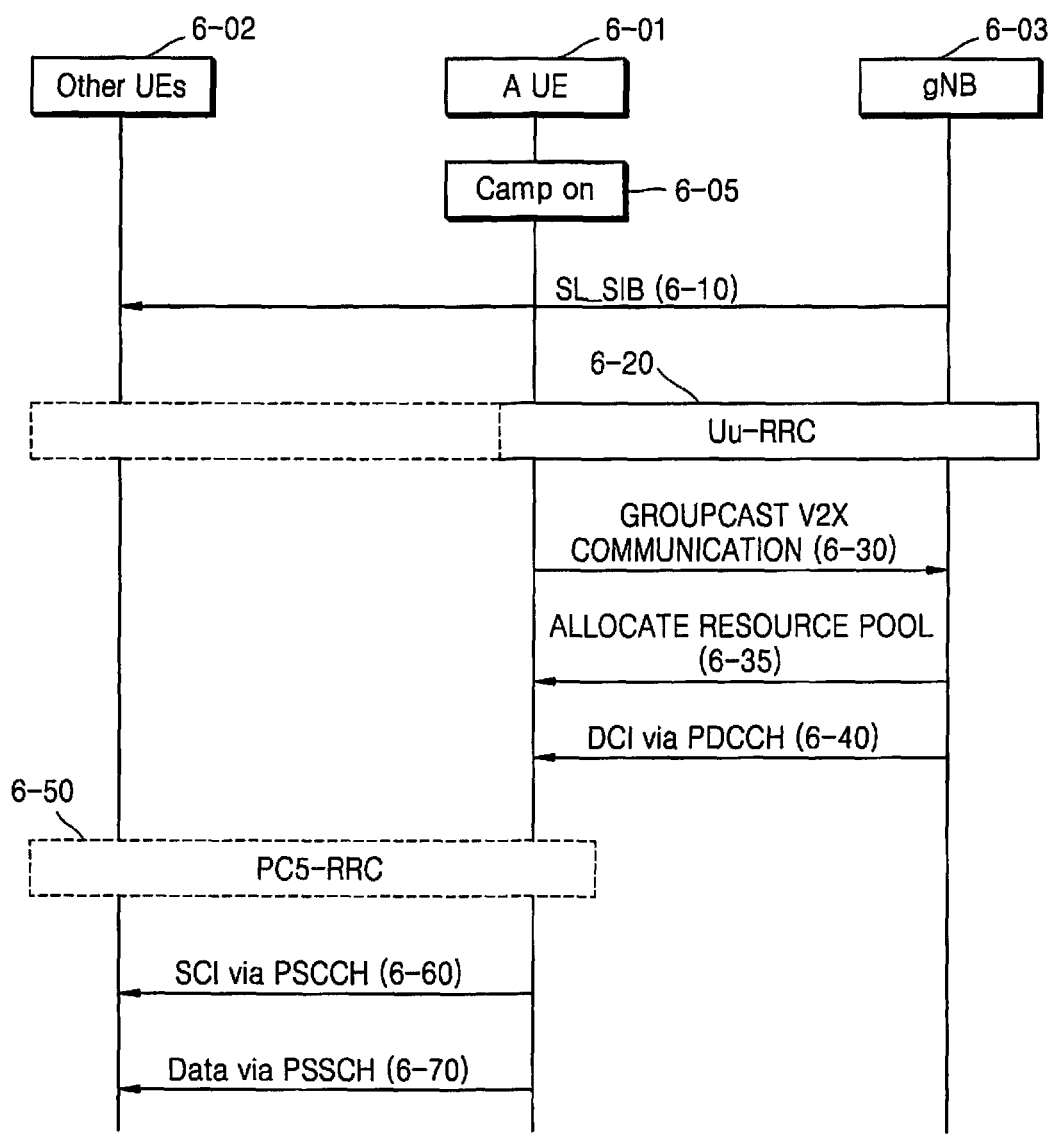
FIG. 6 is a diagram for describing a data transmission procedure of a V2X UE according to scheduled resource allocation in a sidelink transmission mode, according to an embodiment.

In an embodiment, a scheduled resource allocation (mode 1) method in an NR system will be described in more detail. FIG. 6 is a diagram for describing a data transmission procedure of a V2X UE according to scheduled resource allocation in a sidelink transmission mode, according to an embodiment.

Referring to FIG. 6, a UE 6-01 with camping on 6-05 may receive a sidelink SIB from a BS 6-03 in step 6-10. The system information may include resource pool information for transmission and reception, configuration information for sensing operation, information for configuring synchronization, and information for inter-frequency transmission and reception. When data traffic for V2X is generated in the UE 6-01, the UE 6-01 may perform an RRC connection with the BS in step 6-20. The RRC connection may be performed before the data traffic is generated. The UE 6-01 may request the BS 6-03 for transmission resources capable of V2X communication with other UEs 6-02 in step 6-30. In this case, the UE 6-01 may request the BS 6-03 for the transmission resources capable of V2X communication by using an RRC message or a MAC CE. A SidelinkUEInformation message and a UEAssistanceInformation message may be used as the RRC message. The MAC CE may be, for example, a buffer status report MAC CE of a new format (including at least an indicator indicating a buffer status for V2X communication and information about the size of data buffered for D2D communication).

The BS 6-03 may allocate a V2X transmission resource to the UE 6-01 via a dedicated Uu RRC message. This message may be included in an RRCConnectionReconfiguration message. The resource allocation may be a resource for PC5 or a V2X resource through Uu according to the type of traffic requested by the UE or whether the corresponding link is congested. For the determination, the UE 6-01 may additionally transmit ProSe Per Packet Priority (PPPP) or language code identifier (LCID) information of V2X traffic through UEAssistanceInformation or MAC CE.

Because the BS 6-03 also knows information about resources used by other UEs, the BS 6-03 may allocate the remaining resource pools among the resources requested by the UE 6-01 in step 6-35. The BS 6-03 may indicate the final scheduling to the UE 6-01 by DCI transmission via a PDCCH in step 6-40. Next, in the case of the broadcast transmission, the UE 6-01 may broadcast SCI to other UEs 6-02 via a PSCCH in step 6-60 by broadcast without additional SL PC5 RRC configuration 6-50. Also, the UE 6-01 may broadcast data to other UEs 6-02 via a PSSCH in step 6-70. The UE 6-01 may perform only one of performing transmission or performing reception in a single slot configured in a single carrier via the PSSCH.

In contrast, in the case of the unicast and groupcast transmission, after performing the SL PC5 RRC connection 6-50, the UE 6-01 may transmit SCI to other UEs 6-02 via a PSCCH by unicast and groupcast in step 6-60. In this case, the groupcast transmission of the SCI may be interpreted as group SCI. Also, the UE 6-01 may transmit data to other UEs 6-02 via a PSSCH by unicast and groupcast in step 6-70. The UE 6-01 may perform only one of performing transmission or performing reception in a single slot configured in a single carrier via the PSSCH.

Figure 7:
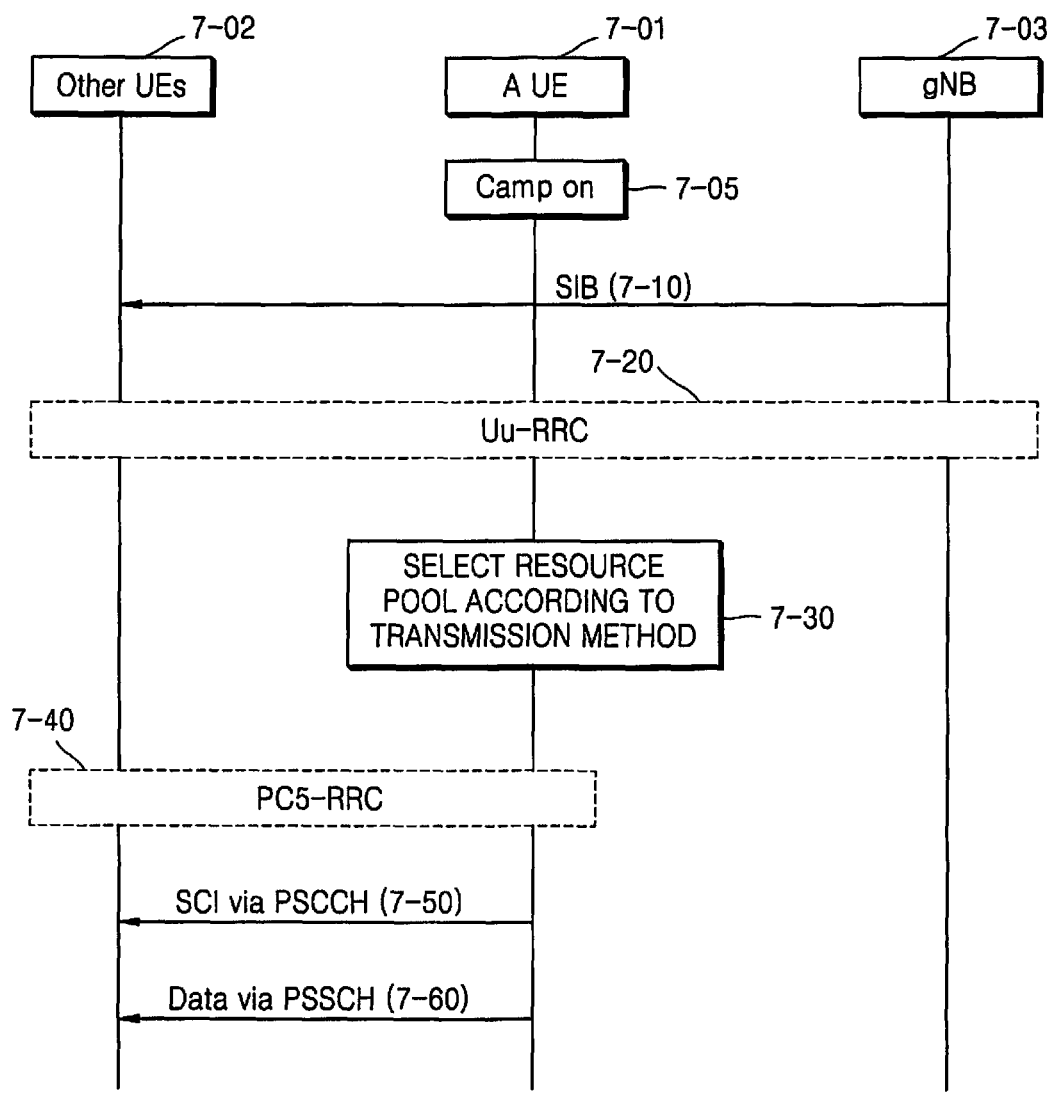
FIG. 7 is a diagram for describing a data transmission procedure of a V2X UE according to UE autonomous resource allocation in a sidelink transmission mode, according to an embodiment.

In an embodiment, a UE autonomous resource allocation (mode 2) method in an NR system will be described. FIG. 7 is a diagram for describing a data transmission procedure of a V2X UE according to UE autonomous resource allocation in a sidelink transmission mode, according to an embodiment. In FIG. 7, a UE 7-01 may autonomously select a resource and transmit data, based on a resource pool previously received through system information.

In a V2X communication, a BS 7-03 may allocate various types of resource pools (e.g., V2V resource pool and V2P resource pool) for the UE 7-01. The resource pool may include a resource pool that allows the UE to sense a resource used by adjacent other UEs and autonomously select an available resource pool, and a resource pool that allows the UE to randomly select a resource from a preset resource pool. The UE 7-01 that has camping on 7-05 may receive an SIB from the BS 7-03 in step 7-10. The system information may include resource pool information for transmission and reception, configuration information for a sensing operation, information for configuring synchronization, and information for inter-frequency transmission and reception.

In the case of FIG. 6, the BS 6-03 and the UE 6-01 operate in a state in which an RRC is connected, and in the case of FIG. 7, the BS 7-03 and the UE 7-01 operate in an idle mode in which an RRC is not connected in step 7-20. Also, in FIG. 7, even when the RRC is connected 7-20, the BS 7-03 may operate to autonomously select a transmission resource, without being directly involved in resource allocation.

When data traffic for V2X is generated in the UE 7-01, the UE 7-01 may select the resource pool of the time and frequency domains according to the transmission operation (dynamic allocation one-time transmission, dynamic allocation multiple transmission, sensing-based one-time transmission, sensing-based multiple transmission, and random transmission) among resource pools received from the BS 7-03 through system information in step 7-30. Next, in the case of the broadcast transmission, the UE 7-01 may broadcast SCI to other UEs 7-02 via a PSCCH in step 7-50 by broadcasting without additional SL PC5 RRC configuration 7-40. Also, the UE 7-01 may broadcast data to other UEs 7-02 via a PSSCH in step 7-60. The UE 7-01 may perform only one of performing transmission or performing reception in a single slot configured in a single carrier via the PSSCH. In contrast, in the case of the unicast and groupcast transmission, after performing the SL PC5 RRC connection 7-40, the UE 7-01 may transmit SCI to other UEs 7-02 via a PSCCH by unicast and groupcast in step 7-50. In this case, the groupcast transmission of the SCI may be interpreted as group SCI. Also, the UE 7-01 may transmit data to other UEs 7-02 via a PSSCH by unicast and groupcast in step 7-60. The UE 7-01 may perform only one of performing transmission or performing reception in a single slot configured in a single carrier via the PSSCH.

Figure 9:
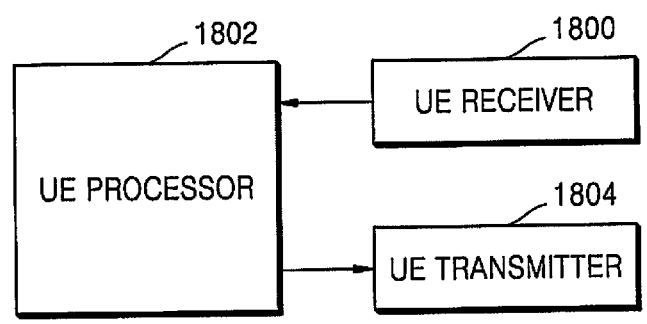
FIG. 9 is a block diagram illustrating an internal structure of a UE, according to an embodiment.
Figure 10:
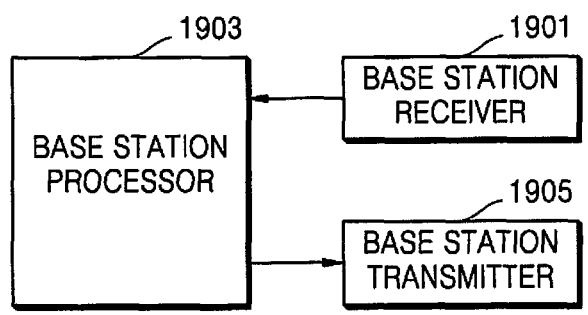
FIG. 10 is a block diagram illustrating an internal structure of a BS, according to an embodiment.

To perform the embodiments of the disclosure, transmitters, receivers, and processors of the UE and the BS are illustrated in FIGS. 9 and 10, respectively. Additionally, provided are methods to perform radio link monitoring (RLM) and radio link failure (RLF), and the operation of the UE in a process in which a vehicle terminal supporting V2X exchanges information with other vehicle terminals and a pedestrian mobile terminal by using a sidelink. To this end, the receivers, the processors, and the transmitters of the BS and the UE operate together.

Figure 8:
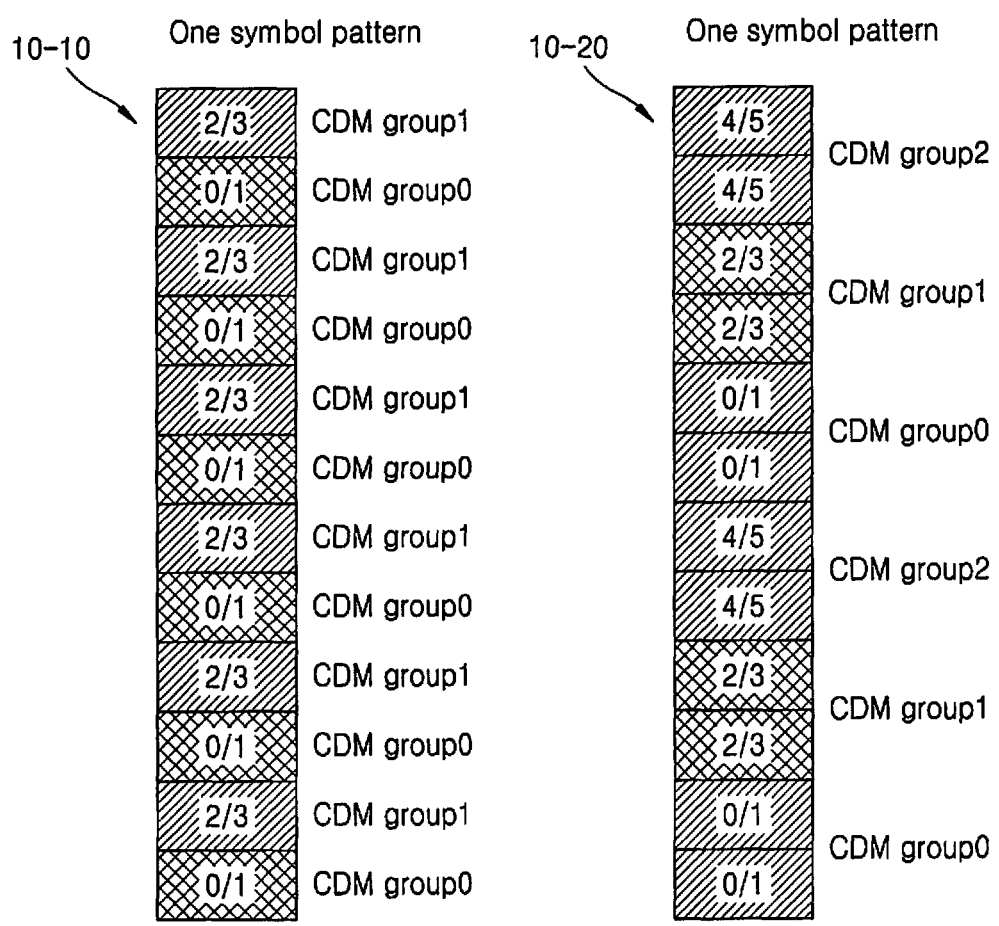
FIG. 8 is a diagram for describing a method by which a transmission UE indicates information about a demodulation reference signal (DMRS) port for a PSSCH in a sidelink, according to an embodiment.

FIG. 8 is a diagram for describing a method by which a transmission UE indicates information about a DMRS port for a PSSCH in a sidelink, according to an embodiment.

Referring to FIG. 8, in the method of indicating the information about the DMRS port for the PSSCH, detailed signaling information may be determined by the following conditions:

Condition 1: Maximum number of orthogonal DMRS ports supported for single-user MIMO (SU-MIMO) per UE.

The method of indicating the DMRS port may be changed by Condition 1.

Condition 2: Maximum number of orthogonal DMRS ports supported for MU-MIMO per UE.

The method of indicating the DMRS port may be changed by Condition 2.

Condition 3: DMRS configuration type used.

The method of indicating the DMRS port may be changed by Condition 3. In this case, for example, DMRS pattern type 1 or DMRS pattern type 2 may be used as the DMRS configuration type of Condition 3. However, the number of usable patterns may be changed.

For example, reference numeral 10-10 of FIG. 8 may be DMRS pattern type 1. Referring to reference numeral 10-10 of FIG. 8, DMRS port numbers mapped to PSSCH REs when DMRS is transmitted to a single symbol may be confirmed. Specifically, based on the lowest RE, DMRS ports 0 and 1 may be mapped to odd REs and DMRS 2 and 3 may be mapped to even REs. In addition, a location at which DMRS ports 0 and 1 are transmitted is code division multiplexing (CDM) group 0 and a location at which DMRS ports 2 and 3 are transmitted is CDM group 1.

In addition, reference numeral 10-20 of FIG. 8 may be referenced as DMRS pattern type 2. Referring to reference numeral 10-20 of FIG. 8, DMRS port numbers mapped to PSSCH REs when a DMRS is transmitted to a single symbol are illustrated. Specifically, based on the lowest RE, DMRS port 0 and DMRS port 1 may be mapped to a blue RE, and DMRS port 2 and DMRS port 3 may be mapped to a green RE. DMRS port 4 and DMRS port 5 may be mapped to a red RE In addition, a location at which DMRS port 0 and DMRS port 1 are transmitted is CDM group 0, and a location at which DMRS port 2 and DMRS port 3 are transmitted is CDM group 1. A location at which DMRS port 4 and DMRS port 5 are transmitted is CDM group 2.

Pattern types 1 and 2 are not limited to reference numerals 10-10 and 10-20 of FIG. 8, and various DMRS patterns (for example, patterns configured by a BS or defined in the standards) may be used.

The DMRS configuration type may be pre-configured in the resource pool.

Condition 4: Whether the number of DMRS CDM groups is indicated.

The method of indicating the DMRS port may be changed by Condition 4.

When the number of DMRS CDM groups is indicated, the following DMRS power boosting may be assumed:

When the number of CDM groups is 1, a ratio of PSSCH EPRE to DMRS EPRE may be assumed as a predefined value or a set value (for example, 0 decibels (dB)).

When the number of CDM groups is 2, a ratio of PSSCH EPRE to DMRS EPRE may be assumed as a predefined value or a set value (for example, −3 dB).

When the number of CDM groups is 3, a ratio of PSSCH EPRE to DMRS EPRE may be assumed as a predefined value or a set value (for example, −4.77 dB).

When the number of DMRS CDM groups is indicated, a reception UE may emulate MU interference in supporting multi-user MIMO (MU-MIMO).

As a method of dynamically indicating the number of DMRS CDM groups, SCI signaling may be considered. In contrast, the number of DMRS CDM groups may be pre-configured in the resource pool. The former has an advantage in that the number of DMRS CDM groups is dynamically adjusted according to a channel situation, and the latter has an advantage in that SCI signaling overhead is reduced.

At this time, information for indicating the DMRS port may be determined based on at least one of Conditions 1 to 4. An example of a method of indicating a DMRS port with a first stage CSI through a PSCCH is illustrated. When the DMRS configuration type is pre-configured in the resource pool by Condition 3, an indicating method may be interpreted and applied according to the configured DMRS configuration type. In addition, in the following example, a case in which Condition 4 does not indicate the number of DMRS CDM groups with SCI may refer to a case in which signaling of the number of DMRS CDM groups is not supported or a case in which the number of DMRS CDM groups is pre-configured in the resource pool and the corresponding configuration is assumed.

When the condition is Condition 1 (2 ports)+Condition 2 (1 port)+Condition 3 (type 2)+Condition 4 (indication), a value of Table 3, below, may be indicated with SCI by the method of indicating the DMRS port to indicate DMRS port related information.

TABLE 3

| Value | Number of DMRS CDM group(s) without data | DMRS port(s) |
| --- | --- | --- |
| 0 | 1 | 0 |
| 1 | 1 | 1 |
| 2 | 2 | 0 |
| 3 | 2 | 1 |
| 4 | 2 | 2 |
| 5 | 2 | 3 |
| 6 | 3 | 0 |
| 7 | 3 | 1 |

TABLE 3-continued

| Value | Number of DMRS CDM group(s) without data | DMRS port(s) |
|---|---|---|
| 8 | 3 | 2 |
| 9 | 3 | 3 |
| 10 | 3 | 4 |
| 11 | 3 | 5 |
| 12 | 1 | 0, 1 |
| 13 | 2 | 0, 1 |
| 14 | 3 | 0, 1 |
| 15 | Reserved | Reserved |

When the condition is Condition 1 (2 ports)+Condition 2 (0 ports)+Condition 3 (type 2)+Condition 4 (indication), a value of Table 4, below, may be indicated with SCI by the method of indicating the DMRS port to indicate DMRS port related information.

TABLE 4

| Value | Number of DMRS CDM group(s) without data | DMRS port(s) |
|---|---|---|
| 0 | 1 | 0 |
| 1 | 2 | 0 |
| 2 | 3 | 0 |
| 3 | 1 | 0, 1 |
| 4 | 2 | 0, 1 |
| 5 | 3 | 0, 1 |
| 6-7 | Reserved | Reserved |

When the condition is Condition 1 (2 ports)+Condition 2 (1 port)+Condition 3 (type 2)+Condition 4 (no indication), a value of Table 5, below, may be indicated with SCI by the method of indicating the DMRS port to indicate DMRS port related information. Condition 4 in Table 5, below, may refer to a case in which signaling of the number of DMRS CDM groups is not supported or a case in which the number of DMRS CDM groups is pre-configured in the resource pool and the corresponding configuration is assumed.

TABLE 5

| Value | DMRS port(s) |
|---|---|
| 0 | 0 |
| 1 | 1 |
| 2 | 2 |
| 3 | 3 |
| 4 | 4 |
| 5 | 5 |
| 6 | 0,1 |
| 7 | Reserved |

When the condition is Condition 1 (2 ports)+Condition 2 (0 ports)+Condition 3 (type 2)+Condition 4 (no indication), a value of Table 6, below, may be indicated with SCI by the method of indicating the DMRS port to indicate DMRS port related information. Condition 4 in Table 6, below, may refer to a case in which signaling of the number of DMRS CDM groups is not supported or a case in which the number of DMRS CDM groups is pre-configured in the resource pool and the corresponding configuration is assumed.

TABLE 6

| Value | DMRS port(s) |
|---|---|
| 0 | 0 |
| 1 | 0,1 |

When the condition is Condition 1 (4 ports)+Condition 2 (2 ports)+Condition 3 (type 2)+Condition 4 (indication), a value of Table 7-1, below, may be indicated with SCI by the method of indicating the DMRS port to indicate DMRS port related information.

TABLE 7-1

| Value | Number of DMRS CDM group(s) without data | DMRS port(s) |
|---|---|---|
| 0 | 1 | 0 |
| 1 | 1 | 1 |
| 2 | 1 | 0,1 |
| 3 | 2 | 0 |
| 4 | 2 | 1 |
| 5 | 2 | 2 |
| 6 | 2 | 3 |
| 7 | 2 | 0,1 |
| 8 | 2 | 2,3 |
| 9 | 2 | 0-2 |
| 10 | 2 | 0-3 |
| 11 | 3 | 0 |
| 12 | 3 | 1 |
| 13 | 3 | 2 |
| 14 | 3 | 3 |
| 15 | 3 | 0,1 |
| 16 | 3 | 2,3 |
| 17 | 3 | 0-3 |
| 18-31 | Reserved | Reserved |

A 4-bit table as shown in Table 7-2, below, may be used by minimizing unnecessary signaling in Table 7-1.

TABLE 7-2

| Value | Number of DMRS CDM group(s) without data | DMRS port(s) |
|---|---|---|
| 0 | 1 | 0 |
| 1 | 1 | 1 |
| 2 | 1 | 0,1 |
| 3 | 2 | 0 |
| 4 | 2 | 1 |
| 5 | 2 | 2 |
| 6 | 2 | 3 |
| 7 | 2 | 0,1 |
| 8 | 2 | 2,3 |
| 9 | 2 | 0-2 |
| 10 | 2 | 0-3 |
| 11 | 3 | 0 |
| 12 | 3 | 1 |
| 13 | 3 | 2 |
| 14 | 3 | 3 |
| 15 | 3 | 0-3 |

When the condition is Condition 1 (4 ports)+Condition 2 (1 port)+Condition 3 (type 2)+Condition 4 (indication), a value of Table 8, below, may be indicated with SCI by the method of indicating the DMRS port to indicate DMRS port related information.

TABLE 8

| Value | Number of DMRS CDM group(s) without data | DMRS port(s) |
|---|---|---|
| 0 | 1 | 0 |
| 1 | 1 | 1 |
| 2 | 1 | 0,1 |
| 3 | 2 | 0 |
| 4 | 2 | 1 |
| 5 | 2 | 2 |
| 6 | 2 | 3 |
| 7 | 2 | 0-2 |
| 8 | 2 | 0-3 |
| 9 | 3 | 0 |
| 10 | 3 | 1 |
| 11 | 3 | 2 |
| 12 | 3 | 3 |
| 13 | 3 | 0-3 |
| 14-15 | Reserved | Reserved |

When the condition is Condition 1 (4 ports)+Condition 2 (2 ports)+Condition 3 (type 2)+Condition 4 (no indication), a value of Table 9, below, may be indicated with SCI by the method of indicating the DMRS port to indicate DMRS port related information. Condition 4 in Table 9, below, may refer to a case in which signaling of the number of DMRS CDM groups is not supported or a case in which the number of DMRS CDM groups is pre-configured in the resource pool and the corresponding configuration is assumed.

TABLE 9

| Value | DMRS port(s) |
|---|---|
| 0 | 0 |
| 1 | 1 |
| 2 | 2 |
| 3 | 3 |
| 4 | 0,1 |
| 5 | 2,3 |
| 6 | 0-2 |
| 7 | 0-3 |

When the condition is Condition 1 (4 ports)+Condition 2 (1 port)+Condition 3 (type 2)+Condition 4 (no indication), a value of Table 10, below, may be indicated with SCI by the method of indicating the DMRS port to indicate DMRS port related information. Condition 4 in Table 10 below may refer to a case in which signaling of the number of DMRS CDM groups is not supported or a case in which the number of DMRS CDM groups is pre-configured in the resource pool and the corresponding configuration is assumed.

TABLE 10

| Value | DMRS port(s) |
|---|---|
| 0 | 0 |
| 1 | 1 |
| 2 | 2 |
| 3 | 3 |
| 4 | 0-2 |
| 5 | 0-3 |
| 6-7 | Reserved |

When the condition is Condition 1 (2 ports)+Condition 2 (1 port)+Condition 3 (type 1)+Condition 4 (indication), a value of Table 11, below, may be indicated with SCI by the method of indicating the DMRS port to indicate DMRS port related information.

TABLE 11

| Value | Number of DMRS CDM group(s) without data | DMRS port(s) |
|---|---|---|
| 0 | 1 | 0 |
| 1 | 1 | 1 |
| 2 | 1 | 0,1 |
| 3 | 2 | 0 |
| 4 | 2 | 1 |
| 5 | 2 | 0,1 |
| 6-7 | Reserved | Reserved |

When the condition is Condition 1 (2 ports)+Condition 2 (0 ports)+Condition 3 (type 1)+Condition 4 (indication), a value of Table 12, below, may be indicated with SCI by the method of indicating the DMRS port to indicate DMRS port related information.

TABLE 12

| Value | Number of DMRS CDM group(s) without data | DMRS port(s) |
|---|---|---|
| 0 | 1 | 0 |
| 1 | 1 | 0,1 |
| 2 | 2 | 0 |
| 3 | 2 | 0,1 |

When the condition is Condition 1 (2 ports)+Condition 2 (1 port)+Condition 3 (type 1)+Condition 4 (no indication), a value of Table 13, below, may be indicated with SCI by the method of indicating the DMRS port to indicate DMRS port related information. Condition 4 in Table 13, below, may refer to a case in which signaling of the number of DMRS CDM groups is not supported or a case in which the number of DMRS CDM groups is pre-configured in the resource pool and the corresponding configuration is assumed.

TABLE 13

| Value | DMRS port(s) |
|---|---|
| 0 | 0 |
| 1 | 1 |
| 2 | 0,1 |
| 3 | Reserved |

When the condition is Condition 1 (2 ports)+Condition 2 (0 ports)+Condition 3 (type 1)+Condition 4 (no indication), a value of Table 14, below, may be indicated with SCI by the method of indicating the DMRS port to indicate DMRS port related information. Condition 4 in Table 14, below, may refer to a case in which signaling of the number of DMRS CDM groups is not supported or a case in which the number of DMRS CDM groups is pre-configured in the resource pool and the corresponding configuration is assumed.

TABLE 14

| Value | DMRS port(s) |
|---|---|
| 0 | 0 |
| 1 | 0,1 |

When the condition is Condition 1 (4 ports)+Condition 2 (2 ports)+Condition 3 (type 1)+Condition 4 (no indication), a value of Table 15, below, may be indicated with SCI by the method of indicating the DMRS port to indicate DMRS port related information.

TABLE 15

| Value | Number of DMRS CDM group(s) without data | DMRS port(s) |
|---|---|---|
| 0 | 1 | 0 |
| 1 | 1 | 1 |
| 2 | 1 | 0,1 |
| 3 | 2 | 0 |
| 4 | 2 | 1 |
| 5 | 2 | 2 |
| 6 | 2 | 3 |
| 7 | 2 | 0,1 |
| 8 | 2 | 2,3 |
| 9 | 2 | 0-2 |
| 10 | 2 | 0-3 |
| 11-15 | Reserved | Reserved |

When the condition is Condition 1 (4 ports)+Condition 2 (1 port)+Condition 3 (type 1)+Condition 4 (indication), a value of Table 16, below, may be indicated with SCI by the method of indicating the DMRS port to indicate DMRS port related information.

TABLE 16

| Value | Number of DMRS CDM group(s) without data | DMRS port(s) |
|---|---|---|
| 0 | 1 | 0 |
| 1 | 1 | 1 |
| 2 | 1 | 0,1 |
| 3 | 2 | 0 |
| 4 | 2 | 1 |
| 5 | 2 | 2 |
| 6 | 2 | 3 |
| 7 | 2 | 0,1 |
| 8 | 2 | 0-2 |
| 9 | 2 | 0-3 |
| 10-15 | Reserved | Reserved |

When the condition is Condition 1 (4 ports)+Condition 2 (2 ports)+Condition 3 (type 1)+Condition 4 (no indication), a value of Table 17, below, may be indicated with SCI by the method of indicating the DMRS port to indicate DMRS port related information. Condition 4 in Table 17, below, may refer to a case in which signaling of the number of DMRS CDM groups is not supported or a case in which the number of DMRS CDM groups is pre-configured in the resource pool and the corresponding configuration is assumed.

TABLE 17

| Value | DMRS port(s) |
|---|---|
| 0 | 0 |
| 1 | 1 |
| 2 | 2 |
| 3 | 3 |
| 4 | 0,1 |
| 5 | 2,3 |
| 6 | 0-2 |
| 7 | 0-3 |

When the condition is Condition 1 (4 ports)+Condition 2 (1 port)+Condition 3 (type 1)+Condition 4 (no indication), a value of Table 18, below, may be indicated with SCI by the method of indicating the DMRS port to indicate DMRS port related information. Condition 4 in Table 18, below, may refer to a case in which signaling of the number of DMRS CDM groups is not supported or a case in which the number of DMRS CDM groups is pre-configured in the resource pool and the corresponding configuration is assumed.

TABLE 18

| Value | DMRS port(s) |
|---|---|
| 0 | 0 |
| 1 | 1 |
| 2 | 2 |
| 3 | 3 |
| 4 | 0,1 |
| 5 | 0-2 |
| 6 | 0-3 |
| 7 | Reserved |

The method of indicating the DMRS port information for the PSSCH, in the disclosure, may be distinguished from the method of indicating the DMRS port information, which is supported in an existing communication system, because the method is based on at least one of the maximum number of orthogonal DMRS ports that has to be supported for SU-MIMO per UE supported in the sidelink, the number of orthogonal DMRS ports that has to be supported for MU-MIMO per UE, the DMRS configuration type used, or whether the number of DMRS CDM groups is supported. In addition, in order to minimize signaling overhead, a method of minimizing unnecessary signaling may be used. In addition, in any of Tables 1-18, the indexing order in the table may be modified.

FIG. 9 is a block diagram illustrating an internal structure of a UE, according to an embodiment.

Referring to FIG. 9, the UE includes a UE receiver 1800, a UE transmitter 1804, and a UE processor 1802. The UE receiver 1800 and the UE transmitter 1804 are collectively referred to as a transceiver. The transceiver may transmit and receive a signal with the BS. The signal may include control information and data. To this end, the transceiver may include an RF transmitter that performs up-conversion and amplification on a frequency of a signal to be transmitted, and an RF receiver that performs low-noise amplification on a received signal and performs down-conversion on a frequency of the received signal. Also, the transceiver may receive a signal via a radio channel, output the signal to the UE processor 1802, and transmit an output signal of the UE processor 1802 via the radio channel. The UE processor 1802 may control a series of processes so that the UE operates according to the above-described embodiment.

FIG. 10 is a block diagram illustrating an internal structure of a BS, according to an embodiment.

Referring to FIG. 10, the BS includes a BS receiver 1901, a BS transmitter 1905, and a BS processor 1903. The BS receiver 1901 and the BS transmitter 1905 are collectively referred to as a transceiver. The transceiver may transmit and receive a signal with the UE. The signal may include control information and data. To this end, the transceiver may include an RF transmitter that performs up-conversion and amplification on a frequency of a signal to be transmitted, and an RF receiver that performs low-noise amplification on a received signal and performs down-conversion on a frequency of the received signal. Also, the transceiver may receive a signal via a radio channel, output the signal to the BS processor 1903, and transmit an output signal of the BS processor 1903 via the radio channel. The BS processor 1903 may control a series of processes so that the BS operates according to the above-described embodiment.

In specific embodiments, the elements included in the disclosure have been expressed in the singular or plural form according to the suggested specific embodiments. However, whether expressions appear in the singular or plural form is appropriately selected according to the suggested situations for convenience of explanation and is not intended to limit the disclosure to the single or plural elements. Even when a certain element is expressed in the plural form, it may be provided with a single element, and even when a certain element is expressed in the singular form, it may be provided with a plurality of elements.

According to the disclosure, a method of operating the resource pool for when time and frequency are non-contiguous in the sidelink communication is provided to allow time and frequency resources of the sidelink to be more freely supported and operated.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method performed by a user equipment (UE), the method comprising:
   receiving resource configuration information for a sidelink;
   identifying a set of slots based on a subcarrier spacing configured for the UE;
   based on a bitmap included in the resource configuration information, identifying at least one slot for a sidelink resource, among the identified set of slots except specific slots, wherein the specific slots include a first slot configured for a sidelink synchronization signal, a second slot in which at least one symbol included in a subset of the second slot is not configured as an uplink (UL) symbol, and a reserved slot, and wherein the subset of the slot is identified based on information regarding a number of symbols and information regarding a location in the slot, included in the resource configuration information; and
   transmitting a physical sidelink shared channel (PSSCH) on the identified at least one slot,
   wherein a slot index k of the at least one slot for the sidelink resource is less than $10240*2^\mu$-Nslss-Ndfs-Nreserved,
   wherein the $\mu$ is an index of the subcarrier spacing configured for the UE, the Nslss is the number of first slots, the Ndfs is the number of second slots and the Nreserved is the number of reserved slots, and
   wherein in case that a value of i-th bit of the bitmap is 1, where i is equal to kmodulo ($L_{bitmap}$) and $L_{bitmap}$ is a length of the bitmap, a k-th slot among the identified set of the slots except the specific slots is identified as the sidelink resource.

2. The method of claim 1, wherein the slot index k of the set of the slots is determined based on slot number 0 of a radio frame corresponding to a system frame number (SFN) 0 or a direct frame number (DFN) 0.

3. A method performed by a base station (BS), the method comprising:
   determining a bitmap for identifying at least one slot for a sidelink resource among a set of slots except specific slots, wherein the set of slots is identified based on a subcarrier spacing configured for a user equipment (UE); and
   transmitting resource configuration information including the determined bitmap for a sidelink,
   wherein the specific slots include a first slot configured for a sidelink synchronization signal, a second slot in which at least one symbol included in a subset of the second slot is not configured as an uplink (UL) symbol, and a reserved slot,
   wherein the subset of the slot is identified based on information regarding a number of symbols and information regarding a location in the slot, included in the resource configuration information,
   wherein a physical sidelink shared channel (PSSCH) is transmitted, from the UE, on the identified at least one slot,
   wherein a slot index k of the at least one slot for the sidelink resource is less than $10240*2^\mu$-Nslss-Ndfs-Nreserved, and
   wherein the $\mu$ is an index of the subcarrier spacing configured for the UE, the Nslss is the number of first slots, the Ndfs is the number of second slots and the Nreserved is the number of reserved slots, and
   wherein in case that a value of i-th bit of the bitmap is 1, where i is equal to kmodulo($L_{bitmap}$) and $L_{bitmap}$ is a length of the bitmap, a k-th slot among the identified set of the slots except the specific slots is identified as the sidelink resource.

4. The method of claim 3, wherein the slot index k of the set of the slots is determined based on slot number 0 of a radio frame corresponding to a system frame number (SFN) 0 or a direct frame number (DFN) 0.

5. A user equipment (UE) comprising:
   a transceiver; and
   a processor configured to:
   receive, via the transceiver, resource configuration information for a sidelink,
   identify a set of slots based on a subcarrier spacing configured for the UE,
   based on a bitmap included in the resource configuration information, identify at least one slot for a sidelink resource, among the identified set of slots except specific slots, wherein the specific slots include a first slot configured for a sidelink synchronization signal, a second slot in which at least one symbol included in a subset of the second slot is not configured as an uplink (UL) symbol, and a reserved slot, and wherein the subset of the slot is identified based on information regarding a number of symbols and information regarding a location in the slot, included in the resource configuration information,
   transmit via the transceiver, a physical sidelink shared channel (PSSCH) on the identified at least one slot,
   wherein a slot index k of the at least one slot for the sidelink resource is less than $10240 \times 2\mu$ -Nslss-Ndfs-Nreserved, and
   wherein the $\mu$ is an index of the subcarrier spacing configured for the UE, the Nslss is the number of first slots, the Ndfs is the number of seconds slots and the Nreserved is the number of reserved slots, and
   wherein in case that a value of i-th bit of the bitmap is 1, where i is equal to kmodulo($L_{bitmap}$) and $L_{bitmap}$ is a length of the bitmap, a k-th slot among the identified set of the slots except the specific slots is identified as the sidelink resource.

6. The UE of claim 5, wherein the slot index k of the set of the slots is determined based on slot number 0 of a radio frame corresponding to a system frame number (SFN) 0 or a direct frame number (DFN) 0.

7. A base station (BS) comprising:
a transceiver; and
a processor configured to:
determine a bitmap for identifying at least one slot for a sidelink resource among a set of slots except specific slots, wherein the set of slots is identified based on a subcarrier spacing configured for a user equipment (UE), and
transmit, via the transceiver, resource configuration information including the determined bitmap for a sidelink,
wherein the specific slots include a first slot configured for a sidelink synchronization signal, a second slot in which at least one symbol included in a subset of the second slot is not configured as an uplink (UL) symbol, and a reserved slot,
wherein the subset of the slot is identified based on information regarding a number of symbols and information regarding a location in the slot, included in the resource configuration information,
wherein a physical sidelink shared channel (PSSCH) is transmitted, from the UE, on the identified at least one slot,
wherein a slot index k of the at least one slot for the sidelink resource is less than $10240 \times 2^\mu$-Nslss-Ndfs-Nreserved, and
wherein the $\mu$ is an index of the subcarrier spacing configured for the UE, the Nslss is the number of first slots, the Ndfs is the number of seconds slots and the Nreserved is the number of reserved slots, and
wherein in case that a value of i-th bit of the bitmap is 1, where i is equal to kmodulo($L_{bitmap}$) and $L_{bitmap}$ is a length of the bitmap, a k-th slot among the identified set of the slots except the specific slots is identified as the sidelink resource.

8. The BS of claim 7, wherein the slot index k of the set of the slots is determined based on slot number 0 of a radio frame corresponding to a system frame number (SFN) 0 or a direct frame number (DFN) 0.

* * * * *